US009009592B2

(12) United States Patent
Friend et al.

(10) Patent No.: US 9,009,592 B2
(45) Date of Patent: Apr. 14, 2015

(54) POPULATION OF LISTS AND TASKS FROM CAPTURED VOICE AND AUDIO CONTENT

(75) Inventors: Ned B. Friend, Seattle, WA (US); Kanav Arora, Seattle, WA (US); Marta Rey-Babarro, Seattle, WA (US); David De La Brena Valderrama, Seattle, WA (US); Erez Kikin-Gil, Redmond, WA (US); Matthew J. Kotler, Sammamish, WA (US); Charles W. Parker, Sammamish, WA (US); Maya Rodrig, Seattle, WA (US); Igor Zaika, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 409 days.

(21) Appl. No.: 13/271,826

(22) Filed: Oct. 12, 2011

(65) Prior Publication Data

US 2012/0035925 A1    Feb. 9, 2012

Related U.S. Application Data

(63) Continuation-in-part of application No. 12/820,676, filed on Jun. 22, 2010, now Pat. No. 8,370,767.

(51) Int. Cl.
*G06F 17/22* (2006.01)
*G06F 3/16* (2006.01)
(Continued)

(52) U.S. Cl.
CPC .......... *G06F 3/167* (2013.01); *G06F 17/30749* (2013.01); *G06Q 10/00* (2013.01)

(58) Field of Classification Search
USPC ......... 715/810, 200, 201, 205, 234, 249, 255, 715/256, 704, 727, 728, 731, 746, 760, 761, 715/762, 772
See application file for complete search history.

(56) References Cited

U.S. PATENT DOCUMENTS 3,964,195 A    6/1976  Jordan
4,162,610 A    7/1979  Levine
(Continued)

FOREIGN PATENT DOCUMENTS

EP        1311102 A1 *   5/2003
EP         681250 A2    11/2005
KR     1020040072755 A   8/2004

OTHER PUBLICATIONS

"Send E-mail and SMS Messages Using Voice Commands With Vlingo for iPhone", Published Apr. 4, 2010, http://mashable.com/2010/03/04/vlingo-iphone/, 6 pages.
(Continued)

*Primary Examiner* — Maikhanh Nguyen
(74) *Attorney, Agent, or Firm* — Jessica Meyers; Jim Ross; Micky Minhas

(57) ABSTRACT

Automatic capture and population of task and list items in an electronic task or list surface via voice or audio input through an audio recording-capable mobile computing device is provided. A voice or audio task or list item may be captured for entry into a task application interface or into a list authoring surface interface for subsequent use as task items, reminders, "to do" items, list items, agenda items, work organization outlines, and the like. Captured voice or audio content may be transcribed locally or remotely, and transcribed content may be populated into a task or list authoring surface user interface that may be displayed on the capturing device (e.g., mobile telephone), or that may be stored remotely and subsequently displayed in association with a number of applications on a number of different computing devices.

16 Claims, 17 Drawing Sheets

(51) Int. Cl.
G06F 17/30 (2006.01)
G06Q 10/00 (2012.01)

(56) References Cited

U.S. PATENT DOCUMENTS

| | | | |
|---|---|---|---|
| 4,769,796 A | 9/1988 | Levine | |
| 4,819,191 A | 4/1989 | Scully et al. | |
| 5,023,851 A | 6/1991 | Murray et al. | |
| 5,428,784 A | 6/1995 | Cahill, Jr. | |
| 5,602,963 A | 2/1997 | Bissonnette et al. | |
| 5,623,404 A | 4/1997 | Collins et al. | |
| 5,692,125 A | 11/1997 | Schloss et al. | |
| 5,709,410 A | 1/1998 | Reeves, Jr. | |
| 5,745,110 A | 4/1998 | Ertemalp | |
| 5,790,974 A | 8/1998 | Tognazzini | |
| 5,860,067 A | 1/1999 | Onda et al. | |
| 5,899,979 A | 5/1999 | Miller et al. | |
| 5,936,625 A | 8/1999 | Kahl et al. | |
| 5,960,406 A | 9/1999 | Rasansky et al. | |
| 5,970,466 A | 10/1999 | Detjen et al. | |
| 6,012,037 A | 1/2000 | Yoshikawa | |
| 6,047,260 A | 4/2000 | Levinson | |
| 6,256,651 B1 | 7/2001 | Tuli | |
| 6,369,840 B1 | 4/2002 | Barnett et al. | |
| 6,446,041 B1* | 9/2002 | Reynar et al. | 704/260 |
| 6,466,236 B1 | 10/2002 | Pivowar et al. | |
| 6,480,830 B1 | 11/2002 | Ford et al. | |
| 6,549,939 B1 | 4/2003 | Ford et al. | |
| 6,578,005 B1 | 6/2003 | Lesaint et al. | |
| 6,640,230 B1 | 10/2003 | Alexander et al. | |
| 6,650,735 B2 | 11/2003 | Burton et al. | |
| 6,680,675 B1 | 1/2004 | Suzuki | |
| 6,769,120 B1 | 7/2004 | Rodriguez | |
| 6,850,609 B1* | 2/2005 | Schrage | 379/202.01 |
| 6,925,603 B1 | 8/2005 | Naito et al. | |
| 6,988,128 B1 | 1/2006 | Alexander et al. | |
| 7,082,402 B2 | 7/2006 | Conmy et al. | |
| 7,103,559 B2 | 9/2006 | Worthington | |
| 7,200,210 B2 | 4/2007 | Tang | |
| 7,236,932 B1* | 6/2007 | Grajski | 704/277 |
| 7,356,770 B1 | 4/2008 | Jackson | |
| 7,366,991 B1 | 4/2008 | Snapkauskas et al. | |
| 7,472,357 B1 | 12/2008 | Satterfield et al. | |
| 7,688,322 B2 | 3/2010 | Kapler et al. | |
| 7,703,048 B2 | 4/2010 | Alford et al. | |
| 7,809,599 B2 | 10/2010 | Andrew et al. | |
| 7,818,197 B2 | 10/2010 | Cho et al. | |
| 8,108,206 B2 | 1/2012 | Hufnagel et al. | |
| 8,370,767 B2 | 2/2013 | Kotler et al. | |
| 8,374,864 B2* | 2/2013 | Kerr | 704/243 |
| 8,682,667 B2* | 3/2014 | Haughay | 704/246 |
| 2002/0016729 A1 | 2/2002 | Breitenbach et al. | |
| 2002/0054118 A1 | 5/2002 | Ishizaki et al. | |
| 2002/0054130 A1 | 5/2002 | Abbott et al. | |
| 2002/0118225 A1 | 8/2002 | Miksovsky | |
| 2002/0194048 A1 | 12/2002 | Levinson | |
| 2002/0194246 A1 | 12/2002 | Moskowitz et al. | |
| 2003/0059000 A1* | 3/2003 | Burton et al. | 379/67.1 |
| 2003/0065544 A1 | 4/2003 | Elzinga et al. | |
| 2003/0103415 A1 | 6/2003 | Bates et al. | |
| 2003/0120717 A1 | 6/2003 | Callaway et al. | |
| 2004/0049385 A1* | 3/2004 | Lovance et al. | 704/260 |
| 2004/0111265 A1* | 6/2004 | Forbes | 704/260 |
| 2004/0125150 A1 | 7/2004 | Adcock et al. | |
| 2004/0139435 A1 | 7/2004 | Cui et al. | |
| 2005/0041667 A1 | 2/2005 | Miller et al. | |
| 2005/0044066 A1 | 2/2005 | Hooper et al. | |
| 2005/0091578 A1 | 4/2005 | Madan et al. | |
| 2005/0108074 A1 | 5/2005 | Bloechl et al. | |
| 2005/0165631 A1 | 7/2005 | Horvitz | |
| 2005/0222971 A1 | 10/2005 | Cary | |
| 2005/0256754 A1 | 11/2005 | Nastacio | |
| 2005/0268503 A1 | 12/2005 | Sassenberg | |
| 2005/0278632 A1 | 12/2005 | McKethan, Jr. | |
| 2006/0041460 A1 | 2/2006 | Aaron | |
| 2006/0069604 A1 | 3/2006 | Leukart | |
| 2006/0074844 A1 | 4/2006 | Frankel | |
| 2006/0136121 A1 | 6/2006 | Eisen | |
| 2006/0136280 A1 | 6/2006 | Cho et al. | |
| 2006/0167686 A1* | 7/2006 | Kahn | 704/235 |
| 2006/0236269 A1 | 10/2006 | Borna | |
| 2006/0239248 A1 | 10/2006 | Hawk et al. | |
| 2006/0259511 A1 | 11/2006 | Boerries et al. | |
| 2007/0055936 A1 | 3/2007 | Dhanjal et al. | |
| 2007/0074121 A1 | 3/2007 | Mullender et al. | |
| 2007/0089071 A1 | 4/2007 | Zinn et al. | |
| 2007/0100619 A1* | 5/2007 | Purho | 704/239 |
| 2007/0143376 A1 | 6/2007 | McIntosh | |
| 2007/0233487 A1* | 10/2007 | Cohen et al. | 704/255 |
| 2007/0288279 A1 | 12/2007 | Haugen et al. | |
| 2008/0076400 A1 | 3/2008 | Moosavi et al. | |
| 2008/0082651 A1 | 4/2008 | Singh et al. | |
| 2008/0102889 A1 | 5/2008 | May et al. | |
| 2008/0175104 A1 | 7/2008 | Grieb et al. | |
| 2009/0055415 A1 | 2/2009 | Golds et al. | |
| 2009/0099845 A1* | 4/2009 | George | 704/235 |
| 2009/0319608 A1 | 12/2009 | Anil et al. | |
| 2010/0004921 A1 | 1/2010 | Hufnagel et al. | |
| 2011/0022387 A1* | 1/2011 | Hager | 704/235 |
| 2011/0208524 A1* | 8/2011 | Haughay | 704/246 |
| 2011/0296322 A1 | 12/2011 | Dhanjal et al. | |
| 2011/0314418 A1 | 12/2011 | Kotler et al. | |
| 2012/0035925 A1 | 2/2012 | Friend et al. | |
| 2012/0260177 A1* | 10/2012 | Sehrer | 715/727 |

OTHER PUBLICATIONS

"Speech-to-Text application introduced in Motorola Droid Android Phone", Published Apr. 24, 2010, http://www.toptechreviews.net/tech-news/speech-to-text-application-introduced-in-motorola-droid-android-phone/, 5 pages.

"Microsoft Gives Mobile Devices a New Voice", Published Nov. 3, 2003, http://www.microsoft.com/presspass/press/2003/nov03/11-03voicecommandlaunch2003pr.mspx, 2 pages.

Mills, Elinor, "Message Sling Offers Voice-to-Text Message Service", Published Sep. 8, 2008, http://news.cnet.com/8301-17939_109-10035531-2.html, 1 page.

Mills, Elinor, "Google offers free voice-activated local search", Published Apr. 6, 2007, http://news.cnet.com/8301-10784_3-6174124-7.html, 2 pages.

"Jott Assistant", Retrieved Jul. 21, 2010, http://jott.com/jott/jott-assistant.html, 4 pages.

International Search Report and Written Opinion mailed Feb. 9, 2012, PCT/US2011/040772.

Conley, K. et al. Towel: Towards an Intelligent To-Do List, IN: the AAAI Spring Symposium on Interaction Challenges for Artificial Assistants, 2007.

Back, Maribeth, et al. FX Palo Alto Laboratory, Palo Alto, California. Published 2009. http://www.fxpal.com/publications/FXPAL-PR-09-499.pdf, 12 pages.

SnapFiles, "SmartToDo Personal Task Manager", Published Jan. 23, 2009, http://www.snapfiles.com/get/smarttodo.html, 3 pages.

Smartcode, "Dynamic Notes 3.46", Published 2008, http://dynamic-notes.smartcode.com/info.html, 2 pages.

Radi, Harald, et al. "Towards Alternative User Interfaces for Capturing and Managing Tasks with Mobile Devices", MoMM 2008, Nov. 24-26, 2008, Linz, Austria. http://www.mayrhofer.eu.org/downloads/pubications/MoMM2008-Towards-Mobile-Task-Management.pdf, 4 pages.

Mistry, Pranav, et al. "Augmenting Sticky Notes as an I/O Interface", MIT Media Laboratory, 20 Ames Street Cambridge, MA 02139. Published Jul. 14, 2009, http://fluid.media.mit.edu/assets/_pubs/p2217_mistry.pdf, 10 pages.

Notice of Allowance mailed Sep. 25, 2012, in co-pending U.S. Appl. No. 12/820,676.

Non Final Office Action of U.S. Appl. No. 12/820,676 mailed Apr. 10, 2012.

\* cited by examiner

POPULATION OF LISTS AND TASKS FROM CAPTURED VOICE AND AUDIO CONTENT

RELATED APPLICATIONS

This application is a continuation-in-part of U.S. application Ser. No. 12/820,676 titled "List Authoring Surface", filed Jun. 22, 2010, the entire content of which is hereby incorporated by reference.

BACKGROUND

With the advent of computers and computer software, a number of advancements have been made to help people manage both their working and non-working lives. To help people who are trying to juggle numerous tasks at work, at home, and in between, electronic tasks and calendaring programs have been developed to assist with the often daunting task of maintaining, tracking and remembering all the things that must be accomplished on a daily basis. Unfortunately, a great number of people are often reduced to handwriting a multitude of notes to themselves on scraps of paper, on notepads, on "sticky" notes and the like. It is not uncommon to see numerous notes adhered to a person's desk, computer screen, home refrigerator, and the like to remind the person to handle one or more tasks. While the person may have access to and may utilize a good electronic task or calendaring program, he or she simply cannot resist handwriting numerous notes to track those things he or she believes are "really" important.

With the dramatic increase and use of mobile computing devices, for example, mobile telephones and mobile computers, while most people may not have ready access to scraps of paper, notepads or "sticky" notes, they typically do have at least one mobile computing device close at hand with which tasks or lists may be entered into one or more electronic tasks lists, calendars, or lists. However, use of such devices for entering task or list items may not be readily available or appropriate under certain circumstances, for example, while the user is driving, or while the user is on the go.

It is with respect to these and other considerations that the present invention has been made.

SUMMARY

Embodiments of the present invention solve the above and other problems by providing automatic capture and population of task and list items in an electronic task or list surface via voice or audio input through an audio recording-capable mobile computing device, such as a mobile telephone or mobile computer, or through a voice or audio capturing means (e.g., microphone) associated with a stationary or wired computing device. According to embodiments, a voice or audio task or list item may be captured for entry into a task application interface or into a list authoring surface interface for subsequent use as task items, reminders, "to do" items, list items, agenda items, work organization outlines, and the like. Captured voice or audio content may be transcribed locally or remotely, and transcribed content may be populated into a task or list authoring surface user interface that may be displayed on the capturing device (e.g., mobile telephone), or that may be stored remotely and subsequently displayed in association with a number of applications on a number of different computing devices. In addition, an audio file containing the captured voice or audio content may be attached to the transcribed and process content to allow user to play back the captured audio file in association with the displayed transcription of the captured voice or audio file, if desired.

Natural language processing may be performed on transcribed voice or audio content, and metadata may be applied to the transcribed and processed content for enhancing use of the content. For example, metadata applied to the transcribed and processed content may allow for efficient filtering, editing, searching, sorting or other similar manipulation of the transcribed and processed content. An event timeline that uses a "fuzzy" reminder method may allow for reminders to be associated with tasks, events and activities where some tasks, events and/or activities must be accomplished or must occur at hard dates/times, but where other tasks, events and/or activities may be accomplished or may occur during soft or "fuzzy" date/time ranges or during no particular date/time range at all.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

DETAILED DESCRIPTION

Figure 1:
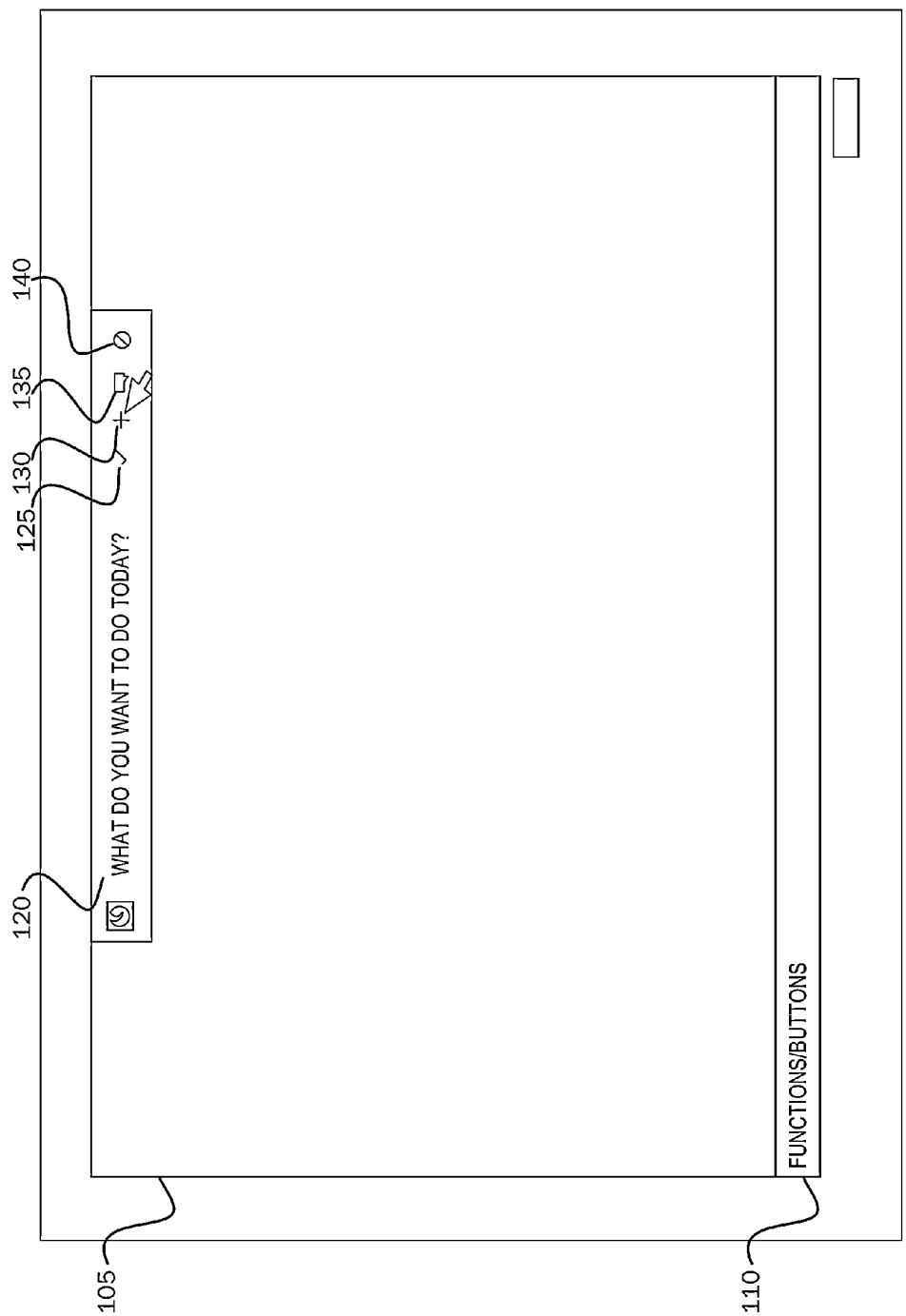
FIG. 1 is a simplified block diagram illustrating a list authoring surface user interface deployed on a display screen of a computer monitor.

As briefly described above, embodiments of the invention are directed to automatic capture and population of task and list items in an electronic task or list surface via voice or audio input through an audio recording-capable mobile computing device, such as a mobile telephone or mobile computer, or through a voice or audio capturing means (e.g., microphone) associated with a stationary or wired computing device. According to one embodiment, voice and audio input may be captured via a voice capture and recognition system equipped in or embedded in an automobile or other vehicle. For example, task or list items may be captured via voice or audio input while a user is driving, while a user is on the go, and long lists of items may be captured without requiring the user to look away from a primary item of focus. Capture of such information may be performed with minimal touch and/or interaction with the capturing device (e.g., mobile telephone), and the capture of the information may be performed without having to pause between input of various task or list items. According to one embodiment, capture of such information may be caused by user prompt via voice commands such as the command "record" or the like. In addition, the decisions or actions on captured items of interest may be deferred to a post-capture time when review of the captured information is more appropriate for the user.

The following detailed description refers to the accompanying drawings. Wherever possible, the same reference numbers are used in the drawing and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

According to embodiments, task items generated from recorded voice and/or audio input may be automatically populated into a task application user interface. In addition, list items, for example, necessary list items (e.g., supplies, grocery lists, and the like), "to do" list items, agenda list items, and the like may be generated from recorded input and may be populated into a list authoring surface on the recording device (e.g., mobile telephone) or on any other mobile or stationary computing device to which the list items may be distributed. The description of FIGS. 1-7 is directed to generation, display and use of list authoring surfaces and task interfaces in association with any application or computing device. The description of FIGS. 8-13 is directed to generation, display and use of list authoring surfaces and task interfaces in association with lists and tasks generated from recorded voice and/or other audio content. The description of FIGS. 14-16 is directed to operating environments with which embodiments of the invention may be practiced.

Referring then to FIG. 1, the list user interface 120 of the list authoring surface may be utilized as an electronic note, scrap of paper, note pad, "sticky" note, and the like that is associated with one or more software application displays for entering either manually or automatically list items, such as tasks, events, activities or other pieces of information, that a user might otherwise jot down on a piece of paper, note or other media for keeping in the forefront such information considered important to the user or for reminding the user. In addition to entering information into the user interface 120, the user interface 120 may be used for quick capture of information from opened documents and in association with opened applications so that the user does not have to leave a current application to launch a task entry user interface. Indeed, the list authoring surface user interface (UI) 120 may be associated with a variety of electronic files, such as electronic documents, electronic mail items, photographs and other images, contacts items, social networking information, and the like. In addition to such content items, the list authoring surface may also be associated with electronic maps for assisting a user with one or more tasks. For example, if a user is in a supermarket, having the list authoring surface associated with location information may be used to trigger reminders for items he/she needs to purchase.

As illustrated in FIG. 1, one or more functionality buttons or controls 125, 130, 135, 140 may be provided in the list authoring surface UI 120 for editing or otherwise manipulating information contained in the UI 120. For example, a control 125 may be utilized for "checking off" completed tasks, a control 130 may be utilized for adding additional tasks, events or other information, a control 135 may be utilized for importing information or for annotating information to be stored or displayed in the user interface 120, and a variety of other controls 140 may be provided for other types of editing, sorting, filtering, searching, and the like information contained in the user interface 120. According to embodiments, selection of one or more functionality controls in association with a task or list item may cause a tagging of the task or list item with metadata associated with the selected functionality control that may be used subsequently for processing the task or list item, as described below.

According to an embodiment, one such control may be used to set the computer with which the list authoring surface is utilized to a "do not disturb" mode so no new email items, instant messaging (IM) items, or other distractions would come to the list authoring surface when the "do not disturb" mode is activated. Another such control 140 may allow a "snooze" mode to be applied to the task currently displayed so that a new task could be displayed instead and so that a user would not have to decide what to do with respect to the "snooze" task. That is, the user could hold the task by applying the "snooze" mode. In addition, the "snooze" mode may be used to filter out information not relevant to the current task only. For example, if a user applies the "snooze" mode to a task of "Plan morale event," and if the user's current task is "Redesign product," and the user gets an email from his/her supervisor about this project, the email about the task of "Redesign project" may be displayed, but emails about the "Plan morale event" task may not be displayed to the user.

According to one embodiment, instead of using a "do not disturb" or "snooze" function, the functionality of the list authoring surface may detect when the user is engaged, for example, talking on a telephone, preparing a document, playing an electronic game, and the like, and the list authoring surface may automatically engage the "snooze" function until the user is available. In addition, users may be able to decide when they may receive reminders when they know they will not be busy, for example, next hour, next day, next week, etc.

Figure 2:
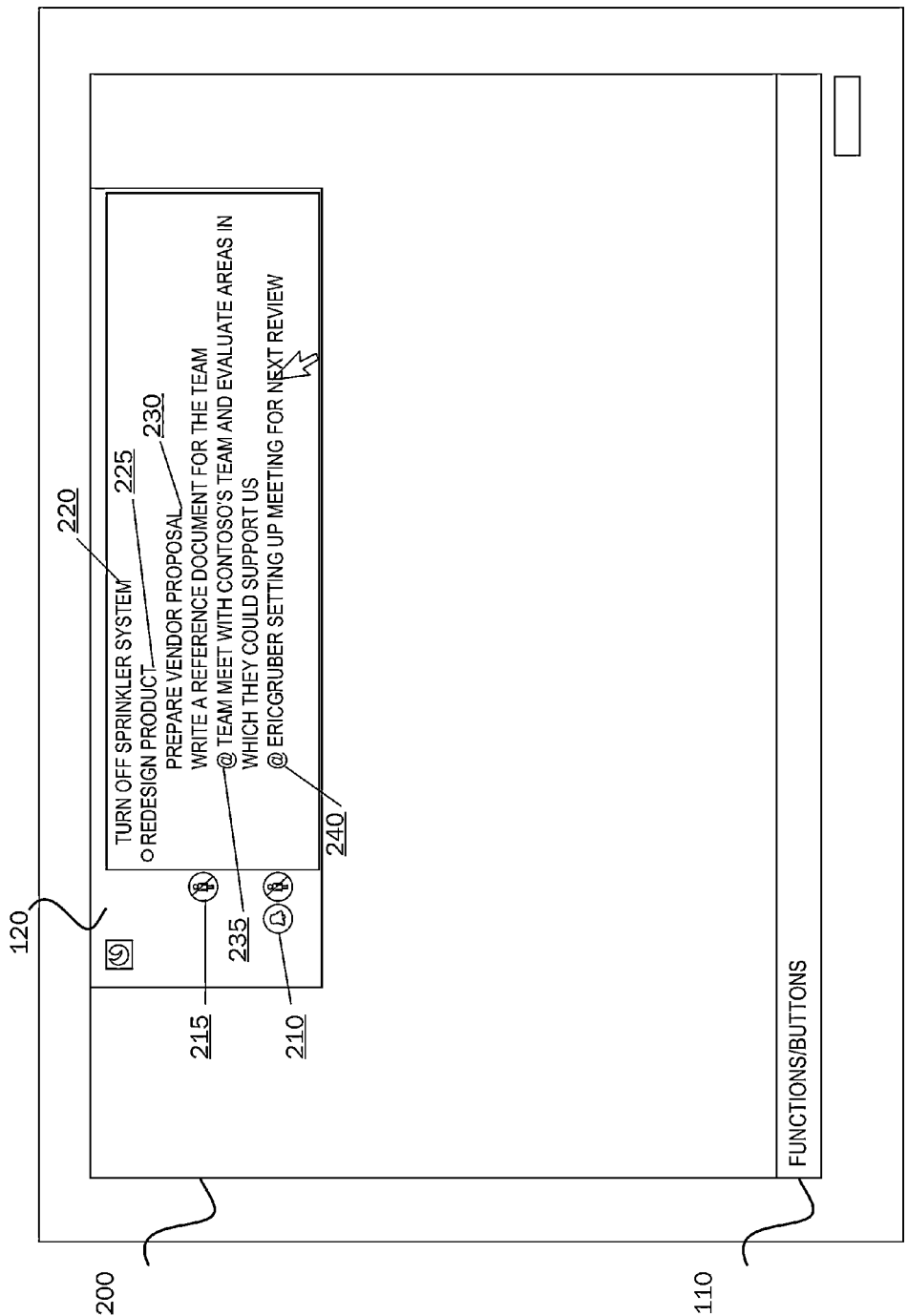
FIG. 2 is a simplified block diagram illustrating a list authoring surface user interface populated with one or more tasks, events, activities, or pieces of information deployed on a display screen of a computer monitor.

Referring now to FIG. 2, the list authoring surface user interface 120 is illustrated in an expanded form showing a variety of list items, for example, tasks, events, activities or other pieces of information, that have been entered either manually or automatically through information capture into the list authoring surface. For example, a first entry 220 of "Turn off sprinkler system" is illustrative of a task a user may enter into the list authoring surface user interface 120 to remind the user to handle this task when he returns home. For another example, a second entry 225 of "Redesign product" is illustrated having a number of subtasks 230 associated with the main task 225. Items displayed in the LAS UI 120 may be displayed according to one or more specified display arrangements, for example, based on designated time of performance, most recent on top, top 5 items as designated by a user, and the like. Such display arrangements may also apply to pivoted displays as described below with reference to FIG. 3.

Advantageously, entering and editing information into the list authoring surface UI 120 is easy and efficient. For example, information may be typed into the UI in a similar manner as entering a bulleted list of items in a word processing document. That is, the user may enter an item, select the "enter" key, "tab" key, or the like, and subsequent entries will be placed in the next row or sentence in the UI 120, but still have all of the benefits of any applied metadata. For example, the LAS UI may be formatted such that a simple carriage return or tab selection may create a hierarchy in entered list items that may be beneficial to the user. For example, the user may enter a first task of "Plan dinner party," followed by a carriage return or tab and then the entry of "Reserve restaurant," followed by another carriage return and the entry "Review menu offerings." By applying a hierarchical formatting to the entered items, the second two items may automatically be listed beneath and indented relative to the first item to create a displayed hierarchical relationship between the items.

According to embodiments, once data or other information is populated into the list authoring surface UI 120, metadata, for example, the phrase "@Team" 235 may be applied to key words, key terms, key phrases, or other information components to allow for structuring, editing, filtering, searching, sorting, or other automated manipulation of text or information contained in the UI 120. For example, the metadata "@Team" 235 may be applied to the task "Meet with Contoso's team and evaluate areas in which they could support us" to indicate that the example task is one of one or more tasks to be completed by a given team. In contrast, the metadata "@EricGruber" 240 is applied to a task of "Setting up meeting for next review" to indicate that task is associated with a particular person.

According to embodiments, such metadata may be applied to the various types of information items and components via a variety of input means as described below with respect to FIGS. 14-16. For example, tasks and list items and applied metadata may be entered and applied via keystroke entry, touch screen entry, voice or other audio entry, gesture entry where an associated computing device is equipped with detection (e.g., camera) functionality for capturing and interpreting user gestures. For example, in accordance with one embodiment of the invention, metadata items may be applied by user speech where a user speaks such metadata items as described herein for application to a given task or list item.

Many other types of metadata may be applied to information in the list authoring surface UI 120. For example, while the example "@" symbol is used above to associate a task with a person or group, the "#" symbol may be used for tagging a task or other information with random metadata. For other examples, the "$" could be used to tag monetary information, the "&" symbol could be used to tag dates or time. As should be appreciated, any of a great number of such metadata types and symbols could be used, and the foregoing are for purposes of example only. Advantageously, such metadata items 235,240 may be associated with information in the list authoring surface UI without entering another text or data entry field or without launching any other user interface component. As also should be appreciated, such metadata applied to various information in the list authoring surface UI 120 will allow for sorting, searching, filtering or otherwise manipulating the information contained in the UI 120. For example, using the metadata "@Team" 235 may allow a sorting on all tasks, events, or other pieces of information to be performed by or that are associated with the team of personnel associated with the metadata "@Team."

In addition to using applied metadata to allow manipulation of information in the list authoring surface UI 120, applied metadata may also be used to add or manipulate data in other list authoring surface UIs of other users. For example, if a first user enters or captures a given piece of information in her list authoring surface UI, and then applies a metadata item such as "@Sarah" to the information, according to an embodiment, "Sarah" may now have the tagged information automatically populated into her list authoring surface UI so that she sees the tagged information as well. On the other hand, other users (e.g., Sarah in the above example) may opt out of this functionality altogether, choose to be part of certain categories of task or list items, or choose to be associated with the functionality at a later date. Thus, if metadata is applied to an item that associated the item with another user, application of the functionality may be limited based on access or privacy settings selected by the other user.

As should be appreciated, an almost limitless amount and type of metadata may be applied to various pieces of information entered in the list authoring surface. For example, such metadata terms as date, time, location, name, address, telephone number, alphanumeric, audio, video and the like may be applied to one or more words, phrases, data, files, and the like for allowing future editing, sorting, searching, or manipulation of the information contained in the list authoring surface. For example, if a metadata type of "date" is applied to all dates contained in the list authoring surface UI 120, such metadata may be utilized for tagging dates contained in the UI 120 to allow a user to filter, sort, or search data contained in the UI 120 based on date. For example, a user may desire to sort all information contained in the UI 120 by date to allow the user to quickly see those tasks or events that are occurring or that should be performed today.

Some types of metadata may be applied automatically. For example, date and time information may be applied automatically based on available information such as calendar entries associated with a task or list item. For another example, location information, such as location information applied in association with a GPS system, may be applied to a task or list item that may be used for generating reminders to the user when the user is near an associated location (e.g., near a supermarket in association with a grocery list).

In addition to the application of metadata to one or more words, phrases or other pieces of information, natural language processing may be utilized for tagging and/or applying metadata to information contained in the list authoring surface. For example, if a phrase such as "Meet at Bob's Pizza Parlor at 6:00 p.m. on Friday" is entered into the list authoring surface user interface 120 a natural language processor may be applied to the phrase to parse the words to determine whether any of the words are associated with a particular information or data type. For example, each word or combination of the words in the example task item may be parsed to determine whether any particular information type is involved. For example, the words "Bob's Pizza Parlor" may be tagged as a name of a business, the time "6:00 p.m." may be tagged as a time, and the day "Friday" may be tagged as a particular day. A natural language processor may parse such phrases into one or more words, and the one or more words may be used for searching dictionaries or stores of words for matching the parsed words with various known words such as restaurant names, times, days, and the like. Once the natural language processor identifies certain words or phrases as belonging to information types, those words or phrases may be tagged with metadata so that the words or phrases may be utilized for searching, sorting, filtering editing or otherwise manipulating the information, as described above.

In addition to such manipulation of listed information, allowing for acting on the listed information is equally important. For example, functionality buttons and controls may be exposed in the list authoring surface UI to allow actions on listed items. For example, the listing of a contact item, such as "Bob's Pizza Parlor" may cause the listing of a "call" button which when selected causes a telephone program to call the listed contact, or an "email," "text" or similar button which when selected may allow an email or text message to be sent to the contact, etc. According to embodiments, such a telephone program may be accessible by a private number. That is, if a user wants to call that private number and hear all his/her recordings by navigating various menus, he/she may do so. Such functionality may be useful for security purposes, for example, if the user has lost use of his/her primary computing device, he/she may access recorded task and list items. As should be appreciated, many other types of action controls may be exposed for listed items. For example, a control for adding listed names and related information to a contacts folder may be exposed, and the like.

According to embodiments, other actions that may be allowed in association with task or list items include publishing those items to others via social networks like FACEBOOK. Thus, task or list items captured via one or more means, including voice capture, may be published to various other users via one or more suitable commands, including voice commands or via application of metadata, as described herein. On the other hand, users may enter task or list items that are private, including application of encryption, passwords, biometric identification and the like, so that only the entering user or designated other users may access those items.

In addition to natural language processing, other methods for recognizing and utilizing particular pieces of information may be used. For example, other methods may include, parsing text or data and passing the parsed text or data to one or more recognizer modules. Still other methods may include use of data analytics to analyze all of the data on the server and show auto-complete or other information (e.g., everyone who enters "Christmas" also happens to tag it with "#holiday" and perhaps you the user would like to as well). In addition, search may be used, for example, entering "Bob's Pizza Parlor" would cause a detection/identification by doing a search and seeing that "Bob's Pizza Parlor" is actually a restaurant that has an associated URL such as www.bobspizzaparlor.com.

According to embodiments, in addition to metadata tags, other list item attributes, including other forms of metadata, may be applied to list items entered into the list authoring surface. For example, list item attributes, such as team attribute, person attribute, date attribute, time attribute, location attribute, name attribute, address attribute, telephone number attribute, alphanumeric attribute, audio attribute, video attribute, and the like may be applied to a given list item. As should be appreciated, the list item attributes may be extensible and customizable, for example, price attributes, location in a store of items on a purchase list, etc. For example, a list item of "@Team1 Meet at 2:00 pm to discuss project" may be additionally annotated with a list item attribute of a person's name, such as "Joe," to create a modified list item of "@Team1 Meet at Joe's office at 2:00 pm to discuss project." The list authoring surface may then associate the first metadata item of "@Team1" with the list item attributes of "2:00 pm" and/or "Joe's office" to generate a task for display in the list user interface 120 of all users who are members of "@Team1.". Association of such metadata items and list item attributes may allow the task to be used more effectively. For example, the resulting task item, may allow the list authoring surface to retrieve information about the members of "Team1," for example, calendaring information to determine whether the members are available at "2:00 pm," and/or the list authoring surface may retrieve contact information to determine the location of "Joe's office." Such information may be automatically added to the list authoring surface 120 as a pivot item out from the resulting task. As should be appreciated, these are only examples of the many ways in which metadata items and other list item attributes may be associated to enhance the effectiveness of task items in the list authoring surface.

Information entered into the list authoring surface UI 120 and tagged or grouped according to one or more metadata types, list item attributes or in association with a natural language processor, as described above, may then be utilized in a variety of helpful ways, including generation and display of resulting tasks. For example, date and/or time annotation or tagging applied to tasks, events, activities or other pieces of information (hereafter referred to as "tasks") may be utilized for manipulating, e.g., editing, sorting, searching, or otherwise manipulating, tasks and related information contained in the list authoring surface according to any applied metadata or list item attributes, e.g., date/time, people, teams, etc. In addition, tasks annotated with a date and/or time metadata may be organized in an events timeline and may be further annotated to help the user accomplish or otherwise handle tasks along a prescribed timeline. As referred to herein, timeline may be broadly defined to include any time representation, including dates, times, calendar information, seasons, years, etc. For example, certain tasks may have hard deadlines, for example, a doctor's appointment on a specific date and time that may not be moved by the user.

Other tasks may require accomplishment or handling during a prescribed date/time range, for example, some time on Friday before 6:00 p.m. According to embodiments of the invention, such date and/or timing information may be applied to tasks entered into the list authoring surface user interface 120 to apply a "fuzziness" to the timing aspect of tasks contained in the user interface. For example, if on a given day two tasks must be accomplished or otherwise handled at very specific times, then those tasks may be annotated with metadata allowing the user to sort, search or otherwise manipulate those items based on the hard dates/times applied. On the other hand, if one or more other tasks must be completed on the same day, but may be completed at any time up to a given end time, for example, 6:00 p.m., then those tasks may be annotated with a metadata type allowing those items to move in the events timeline associated with tasks that must be accomplished or otherwise handled on the prescribed day so long as the times for accomplishing or otherwise handling those items do not go beyond a prescribed outer time limit, for example, 6:00 p.m. For another example, if a user wants to mow his/her lawn in the morning and go to a specific restaurant that evening, the list authoring surface may allow capturing times like "Morning" and "Evening" in the same way that using a paper calendar they may put the mowing activity towards the top of the box for that day and the restaurant name towards the bottom of the box for that day without a specific time for either. According to an embodiment, then, sorting, searching or otherwise manipulating list items contained in the list authoring surface UI 120 may be accomplished on list items having hard date/times, or may be accomplished on list items having soft or fuzzy date/times, or a combination thereof. For further description of hard dates/ times and soft or fuzzy dates/times, see U.S. application Ser. No. 11/422,837 titled "Entering and Using Time Ranges", filed on Jun. 7, 2006, and U.S. application Ser. No. 11/625, 914 titled "Flexible Electronic Calendar Integrating Tasks and Appointments", filed on Jan. 23, 2007, both of which are hereby incorporated by reference in their entireties.

The list authoring surface UI 120 may provide reminders to the user to accomplish or otherwise handle tasks contained in the list authoring surface UI 120, and the inclusion of metadata associated with hard dates/times and metadata associated with soft or fuzzy dates/times may be utilized for providing a more realistic experience to the user. For example, a reminder of an upcoming hard date/time, for example, a specific appointment, may be of one variety of reminders associated with a soft or fuzzy date/time may be of a different type of reminder that is less urgent in comparison to a reminder associated with a hard date/time. In addition, tasks associated with a soft or fuzzy date/time may be automatically floated through a given day's schedule until a prescribed end point, for example, no later than 6:00 p.m. is approached. Thus, the reminders associated with hard date/time items as compared to soft or fuzzy date/time items may be accomplished in a way that more closely approximates how a user might remind himself or herself of such items by jotting the items down on a scrap of paper, notepad, sticky note, and the like.

As described in further detail below, the list authoring surface user interface 120 may be deployed in association with a multitude of software applications and data associated with different software application types. For example, the list authoring surface may be utilized for receiving information from or capturing information from a variety of electronic files, such as word processing documents, spreadsheet application documents, slide presentation application slides, Internet browser content, social media site content, video applications, audio applications, electronic inking, for example, handwriting electronically with a stylus and electronic writing pad, photographs, electronic mail items, calendar items, task items from other tasks, speech-to-text files, and the like. In addition, information stored for the list authoring surface may be utilized by other applications for enhancing the functionality of the list authoring surface.

Consider the example entered or captured task in the form of the phrase "Meet at Bob's Pizza Parlor at 6:00 p.m. on Friday." Once individual words or phrases in the entry are parsed, recognized, annotated, or otherwise tagged with metadata as described above, those tagged items may be utilized by other applications to enhance the functionality of the list authoring surface. For example, the business name of "Bob's Pizza Parlor" may be passed to a software application for determining a location of Bob's Pizza Parlor. The location of Bob's Pizza Parlor may in turn be passed to a global positioning system (GPS) mechanism of the user's global device, for example, a phone, personal digital assistant, etc., the time associated with the entry of "6:00 p.m. on Friday" may be passed to a calendar function utilized by the user, and any other words or phrases of interest in the phrase may be thus utilized. Now, following with this example, if the user leaves his or her office and is utilizing a mobile device, to which he has deployed the list authoring surface UI 120, as will be described below, as the user approaches the location of the example "Bob's Pizza Parlor" or as the user approaches the designated time of "6:00 p.m. on Friday," or a combination of the two, a reminder may be provided to the user via his mobile device that the time for meeting at "Bob's Pizza Parlor" is approaching, or that the location of "Bob's Pizza Parlor" is approaching, or of a combination of the above. Use of presence data (for example, location of a mobile device as determined by signal strength or GPS positioning) may also be used to relate information or task reminders in the list authoring surface to other pertinent information, such as calendar items, meeting locations, etc. In addition, if the meeting reminder is associated with a particular person or group of persons, the list authoring surface may query a contacts application for contacts information for the person or persons and make that information available through the list authoring surface UI 120.

For another example, if a user enters a task associated with the editing of a particular portion of a given word processing document, metadata associated with an identification of the particular document may be applied to the task entered into the list authoring surface user interface 120. When the user next opens the specified word processing document, a reminder may surface in the list authoring surface UI 120 to remind the user that a particular paragraph in the word processing document should be edited. According to one embodiment, if such a document is not already opened, if the user sees a reminder to edit an identified document, the document may be opened directly from the list authoring surface UI 120 by selecting the document identified in the UI 120.

Referring still to FIG. 2, one or more functionality buttons and controls may be exposed in the user interface 120, in addition to those described above with reference to FIG. 1. A reminder function 210 may allow a user to mark a given task or information item in the UI 120 for setting a desired reminder date/time. A private notification function 215 may allow a user to mark a given task or information item as "private" so that the task or information item is not exposed to other users via their list authoring surface user interfaces. As should be appreciated, the functions 210 and 215 are only examples of the many functions that may be exposed in the list authoring surface UI 120 for applying useful metadata or function to tasks or information items listed in the UI 120.

Figure 3:
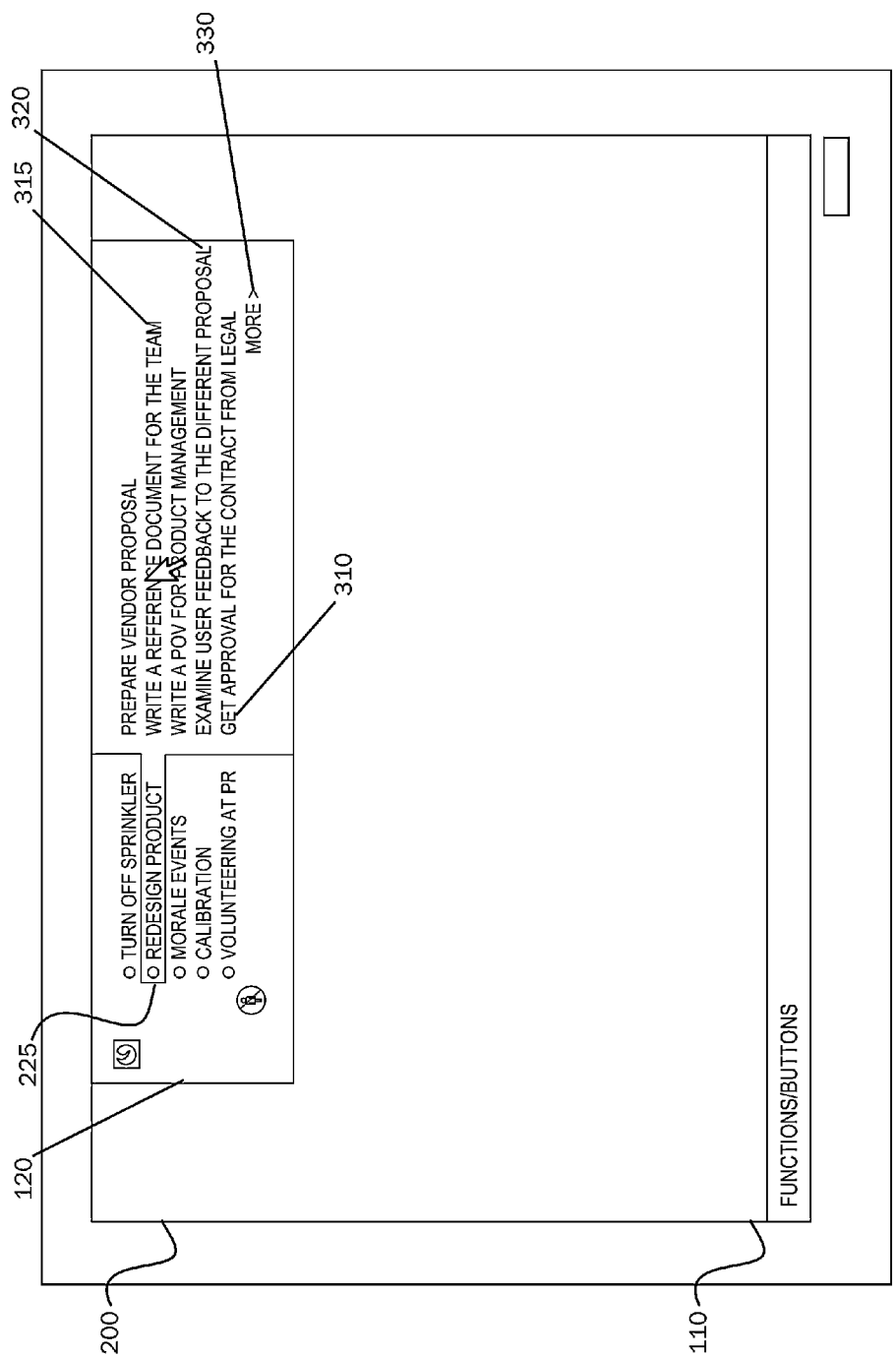
FIG. 3 is a simplified block diagram of the list authoring surface user interface of FIG. 2 showing a list of information pivoting out from a selected task item.

FIG. 3 is a simplified block diagram of the list authoring surface list user interface 120 of FIG. 2 showing a list of information pivoting out from a selected task item. As should be appreciated, for any individual task or other piece of information entered into the list authoring surface, one or more subtasks, sub events, or sub items of information may be entered and associated with any previously entered tasks. For example, referring to FIG. 3 a variety of tasks or other pieces of information 315, 320, have been entered in association with a parent task 225 of "Redesign product." According to an embodiment, selection of the parent task 225 allows for the launching of a pivot table 310 within the list authoring surface user interface 120 for displaying the subtasks 315, 320 associated with the parent task 225. A "More" button 330 is illustrated for allowing a display of additional subtasks under the selected parent subtask 225 if the available size of the user interface 120 only provides for an initial display of a fixed number of tasks, events, activities or other pieces of information. According to one embodiment, a specified maximum number of displayed subtasks, for example five subtasks, may be displayed to keep the user's focus on a "top" number of important tasks. As should be appreciated, subtask information displayed in the pivot table 310 may be filtered, searched, sorted, or otherwise manipulated as is the case with information contained in the main user interface 120.

Figure 4:
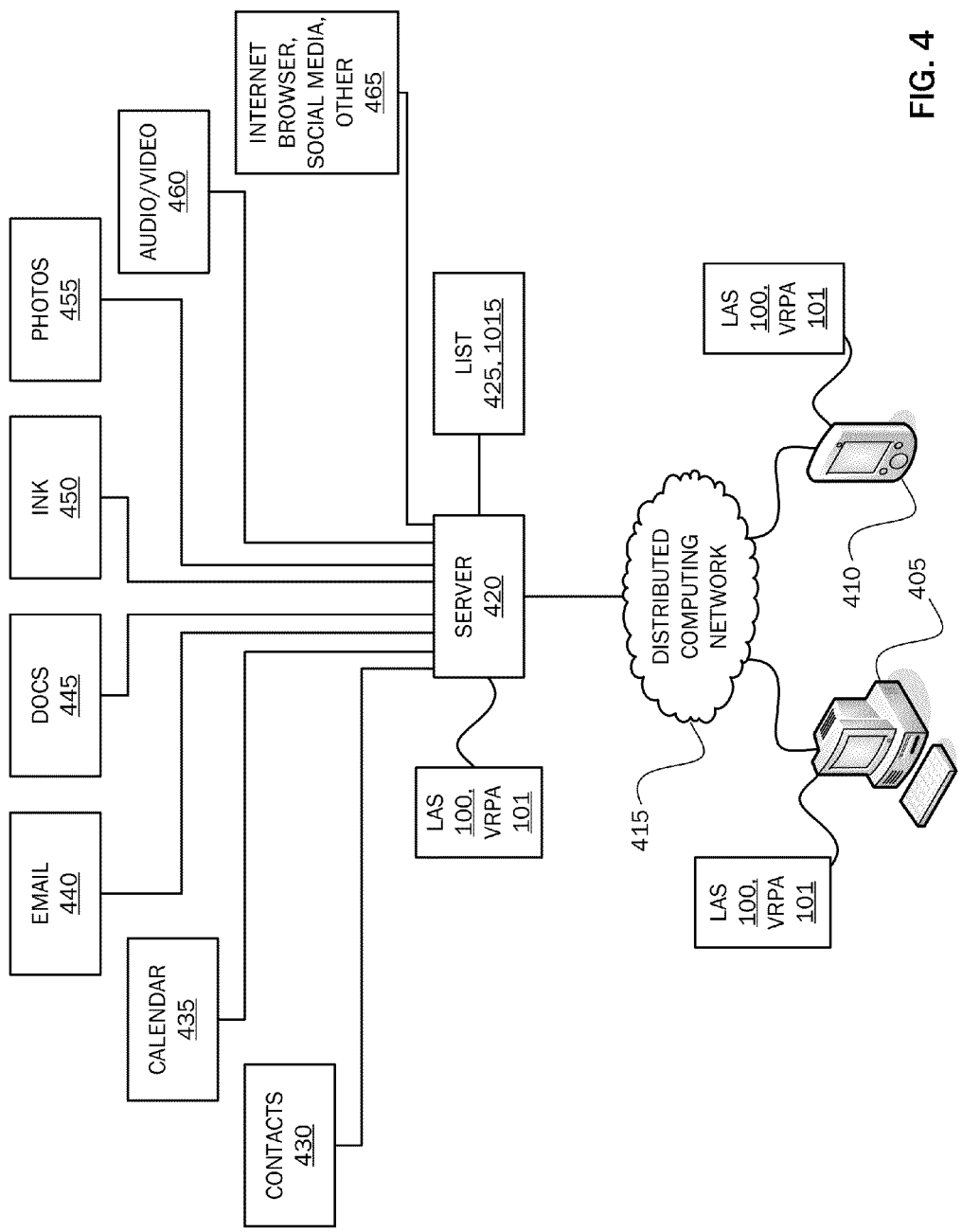
FIG. 4 is a simplified block diagram of a computing architecture in which embodiments of the present invention may be practiced.

FIG. 4 is a simplified block diagram of a computing architecture in which embodiments of the present invention may be practiced. Referring to FIG. 4, the desktop or laptop computer 405 is illustrative of any stationary computing device utilized by a user for entering, capturing or otherwise utilizing data in association with the list authoring surface described herein. The mobile device 410 is illustrative of a mobile telephone, personal digital assistant, wirelessly connected laptop computer, slate or tablet type computing device, or any other computing device with which a user may utilize the list authoring surface in a mobile environment. The distributed computing network 415 is illustrative of any suitable means for allowing the computing devices 405, 410 to communicate with one or more applications or databases via a remote server 420, for example, the Internet, a corporate intranet, a home-based intranet, and the like.

The server 420 is illustrative of a general purpose computing device operating as a remote server on which the functionality of the list authoring surface may be maintained for allowing the list authoring surface to follow the user from one device 405 to another device 405 to a mobile device 410, or to any other device on which the list authoring surface UI 120 may be deployed for use as described herein. According to an embodiment, all functionality and data storage associated with the list authoring surface and the associated user interface 120 may take the form of a list authoring surface application or module 100 having sufficient computer-executable instructions for performing the functions described herein. The list authoring surface application or module 100 and/or the voice recording and processing application 101 (described below) may be resident on a single computing device 405 or 410 for use in association with data accessible by the devices 405 and 410. Alternatively, the functionality and associated data for the list authoring surface and its associated user interface 120 may be maintained and operated at the remote server 420, as illustrated in FIG. 4.

The list 425, 1015 is illustrative of a database list or table accessible by the device 405 or 410 locally or via the server 420 where information entered manually or automatically into the list authoring surface and displayed via the associated user interface 420 may be maintained. As should be appreciated, if the user is not in a distributed computing environment, the list 425, 1015 and associated stored data may be stored or cached on a local computing device 405, 410. That is, according to an embodiment, each instantiation of the list authoring surface may cause the generation of a list table 425, 1015 maintained in a database stored locally on the computing device 405, 410 or stored in association with the server 420.

In the list 425, 1015, each task, event, activity, or other piece of information may be assigned to and stored in a given line in the list 425, 1015. In addition to storing each individual entry, information identifying annotations applied to individual entries, for example, metadata, or other identifying information may be stored in the list 425, 1015 with the associated information entry. Moreover, if the information is associated with other data, for example, a document, calendar item, electronic mail entry, or if an entry is associated with other information, for example, global positioning system location data, date/time data, and the like, information identifying such associations may also be stored on a line in the list 425, 1015 or linked to a different list 425, 1015 with each associated task, event, activity or other piece of information entered manually or automatically into the list authoring surface. As new data is added to the list authoring surface user interface, or as data is changed in the list authoring surface, or as data contained in the list authoring surface is associated with other information, the data stored in list 425, 1015 is updated. According to alternative embodiments, the list items 425, 1015 and associated data may be stored according to a variety of different means aside from a data base line described above. For example, the list items and associated data may be stored as extensible markup language (XML) representations or similar representations across multiple linked lists, tables and the like that are available to or accessible by the list authoring surface.

Referring still to FIG. 4, a variety of information sources available to the list authoring surface are illustrated. For example, information from a contacts application or database 430 may be utilized for obtaining information for entry into the list authoring surface. Information from a calendaring application 435 and associated data storage may similarly be obtained. As will be described below, information from an electronic mail application and associated content 440 may be utilized for populating the list authoring surface. Information from a variety of documents 445, for example, word processing documents, slide presentation documents, spreadsheet application documents, and the like may be utilized for population of data into the list authoring surface. An ink application 450 is illustrative of an electronic pen and ink application for allowing data entry, for example, through contact of a stylus with an electronic writing pad. Photos applications/storage 455 is illustrative of any application or data storage through which photographs may be obtained and copied or moved to the list authoring surface. The audio/video application and storage 460 is illustrative of one or more means for obtaining audio or video files, for example, a recording mechanism operated through a digital or analog recording device or camera such as might be available through a mobile telephone and the like. Content for the list authoring surface may also come from Internet browsers, social media sites, or other sources 465. As should be appreciated, data and information from any other available source for electronically moving or copying or otherwise entering data may be utilized for populating the list authoring surface and its associated user interface 120 with tasks, events or other information of interest.

While the various data or information illustrated in FIG. 4 are illustrated in association with the server 420, each of these sources of data and/or information may also be directly associated with and/or stored at local computing devices 405, 410. In addition, according to embodiments, information from one or more sources to the list authoring surface is not a one-way communication. That is, according to embodiments, the list authoring surface and/or individual task lists or task list items may be linked to the source from which task list items were obtained (e.g., a word processing document), and information from the task list may be pushed back to the source. For example, if a piece of information in the form of a task item is in the LAS UI 120, that information may be pushed back to a source from which it came. As should be appreciated, a variety of mechanisms may be utilized for pushing information back to the source. A path to the source may be associated with each respective task list item. A selection of the task list item may cause exposure in the LAS UI 120 of a selectable button or control for pushing the selected item back to the source and/or for launching the source document.

Figure 5:
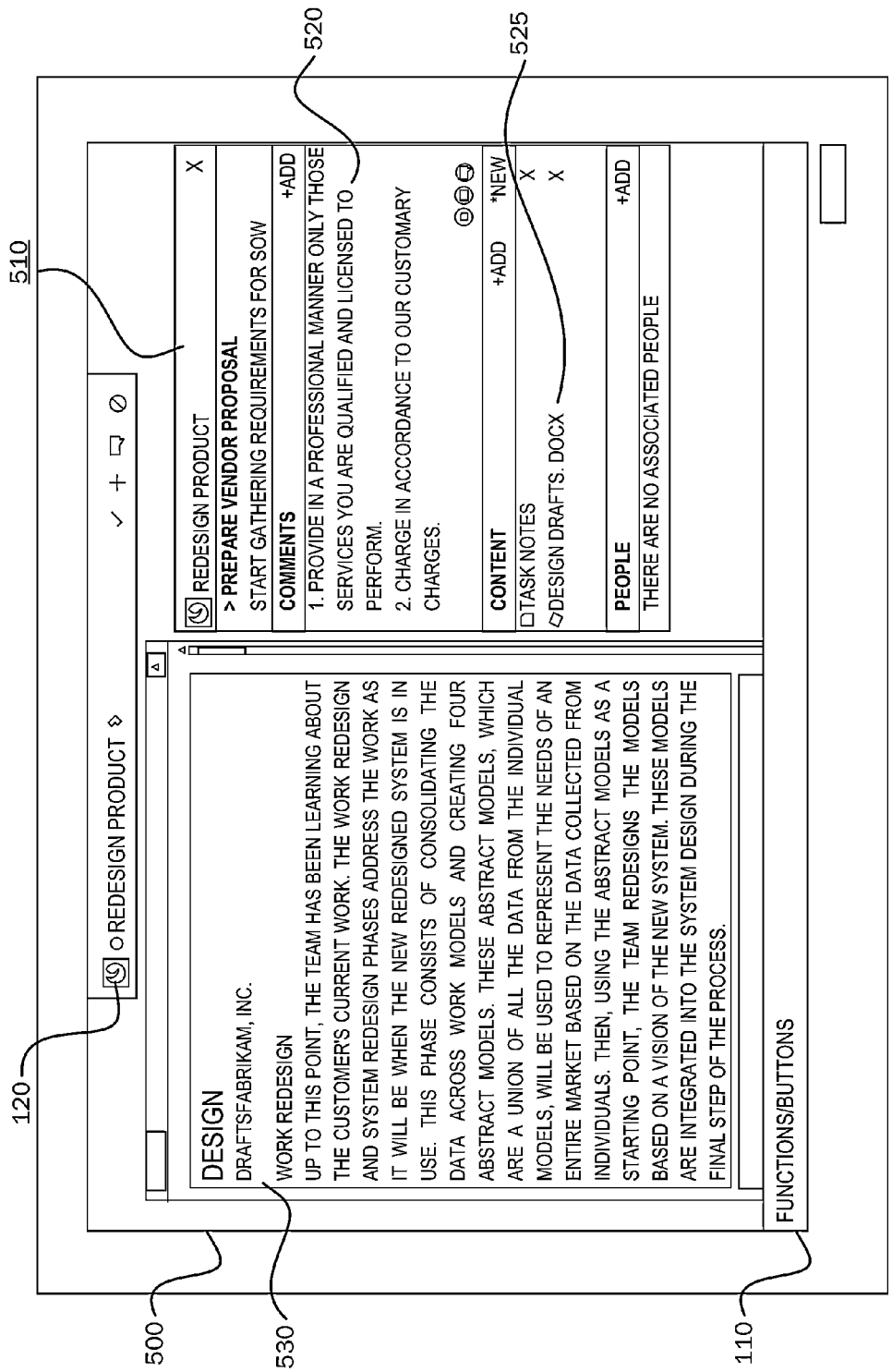
FIG. 5 is a simplified block diagram illustrating a list authoring surface user interface displayed in association with a displayed document.

FIG. 5 is a simplified block diagram illustrating a list authoring surface interface 120 and a list authoring surface information input component 510 in association with a displayed document. As described above, information may be entered into the list authoring surface user interface 120 manually or automatically through information capture as described below. As illustrated in FIG. 5, an example document 530 is illustrated displayed on the computer monitor display screen 500 in association with an example word processing application. According to embodiments of the invention, an expanded version of the list authoring service user interface 120 may be deployed as illustrated and described above with respect to FIGS. 2 and 3 for entering any desired information including information about or associated with a displayed document 530. According to another embodiment, a list authoring surface information input component 510 may be deployed in association with the list authoring surface user interface 120 for entering and annotating data about a given task or information item in the list authoring surface UI 120. The list authoring surface information input component 510 may be deployed as part of an application in use for authoring the document 530 (e.g., word processing application), or the input component 510 may be deployed as a separate input application launched in proximity with the document for entering and annotating data about a given task or list item.

According to the example illustrated in FIG. 5, the list authoring surface information input component 510 has been launched in association with the task "Redesign product" and displayed in the list authoring surface UI 120. The list authoring surface information input component 510 includes a title section for providing data to identify the information being entered in association with a given task, event or other piece of information included in the list authoring surface. For example, the list authoring surface information input component 510, illustrated in FIG. 5, is identified in association with the task of "Prepare vendor proposal" which is a subtask of the parent task "Redesign product." Underneath the title portion of the list authoring surface information input component 510 is a comment section 520 for allowing a user to enter comments which may be additional tasks, events, activities or other information associated with the example subtask. For example, the comments entered in the comments section 520 may be subtasks to the subtask "Prepare vendor proposal," or the comments entered in the comments section 520 may simply be comments to remind the user of various aspects of the associated subtask.

A content section 525 is provided for allowing other content items, for example, documents, audio files, video files, or other content types to be associated with the example task or subtask. A "people" section is illustrated at the bottom of the list authoring surface information input component 510 for associating one or more people, groups of people or teams with the subtask. For example, as was described and illustrated above with respect to FIG. 2, a team grouping that may be utilized in association with a metadata tag of "@Team" 235 may be applied to a given task or subtask. Other groupings or individual persons may similarly be associated with one or more tasks or subtasks entered into the list authoring surface 100 and its associated UI 120. As should be appreciated, the configuration, layout and fields illustrated in the list authoring surface information input component 510 are for purposes of example only and are not limiting of other text, data entry or data annotating fields or sections that may be provided in the list authoring surface information input component 510.

Referring still to FIG. 5, the document 530 displayed on the display screen 500 is illustrative of any document, such as a word processing document, spreadsheet document, slide presentation document, notes document, tasks document, calendaring document, and the like that may be displayed on the display screen 500. As is illustrated in FIG. 5, the document 530 is being processed in some manner by a user, and the user decides to enter information into the list authoring surface 100 via the list authoring surface information input component 510 about the displayed document. For example, as the user is editing the displayed document, the user may remember that one or more tasks should be performed in association with the project referenced in the displayed document. Thus, by launching the list authoring surface user interface 120 and subsequently launching the list authoring surface information input component 510, the user may insert tasks, comments, content items or associate the document or portions of the document or tasks associated with the document with one or more people, groups or teams of people just as the user might handwrite such notes or annotations on a scrap of paper or sticky note to remind the user subsequently to deal with those matters. According to an alternate embodiment, entering tasks or other information into the LAS UI 120 while a document 530 is opened may cause tasks or other information entered into the UI 120 to be automatically associated with the document (i.e., metadata representing the document may be applied to the entered tasks or other information).

According to one embodiment, authoring or otherwise creating or capturing lists of tasks or other information in other authoring applications, such as email applications and notes applications may be stored in the list authoring surface either on a local computing device 405, 410 or remotely via the server 420. Such lists of task or other information may then be synchronized with information a user has entered or captured into his/her list authoring surface and may be displayed in the LAS UI 120, as described herein. For example, the LAS UI 120 may be deployed inside or in association with other applications like an Internet browser, email client application, word processing application, note-taking applications, calendar application, etc. and entering a list of items in association with one of those applications may populate the LAS UI 120 and may be associated with the LAS UI 120 of other users. For example, a user may type a list of items to bring to a dinner party inside an email item the user is generating to invite others to the dinner party, and then those items may automatically appear in the user's list authoring surface UI 120. If the user's LAS UI 120 is synchronized with other users' LAS UIs, he/she may be able to then see what others are bringing to the party as they update the email.

In addition, an auto-complete functionality may be provided wherein new items and sub-lists may be auto-completed based on other items the user or other users have entered or captured in the past. For example, when packing for a trip, if a user types "pack" then all the sub-items the user had for "pack" in the past are automatically suggested for his/her list so he/she does not have to retype or remember them again. And, packing items other people whose list authoring surfaces are associated with the present user (e.g., the user's social network) may be exposed to the present user via his/her LAS UI 120. This may use search to process the many existing tasks of the present user or of other associated users.

According to an embodiment, the list authoring surface may automatically hide some items or information so the lists do not get too long. For example, when a list item has been on the user's list for more than two weeks, or two weeks past the due date, it automatically gets hidden so the user does not feel overwhelmed or guilty for things he/she has not accomplished or things he/she does not intend to accomplish. Alternatively, an expiration date may be automatically set on every item when it is added such that items are hidden from display after the expiration date passes.

As illustrated and described above with reference to FIG. 4, the list authoring surface 100 and its associated user interface 120 may be utilized in a stationary computing system 405, or the list authoring surface may be utilized in association with one or more mobile devices 410. Advantageously, information stored in the list authoring surface in the list 425,1025 in association with the server 420 may be deployed across a variety of applications, as described herein, and may be deployed on a user's mobile device when the user is on the go. Thus, the list authoring surface allows the user to, in effect, carry an electronic version of a "to do" list when the user leaves the desktop operating environment by having the list authoring surface and its associated user interface 120 deployed on his or her mobile computing device, such as a mobile telephone, personal digital assistant, slate or tablet type computing device, wireless gaming device, and the like.

According to embodiments, the list user interface may be imported to the stationary computing device 405 and to the mobile computing device 410 from the remote server 420. When tasks are displayed in the list user interface, an instantiation of the list user interface may be displayed on the stationary computing device and on the mobile computing device. When changes are made to tasks in the list user interface at the remote server, the changes are passed to the stationary and mobile devices in the form of new instantiations of the list user interface displayed on the stationary computing device and on the mobile computing device. In addition, when changes are made to tasks in the list authoring surface UI 120 at either the stationary or mobile computing devices, such changes may be passed up to the list authoring surface and associated data storage at the remote server 420.

Figure 6:
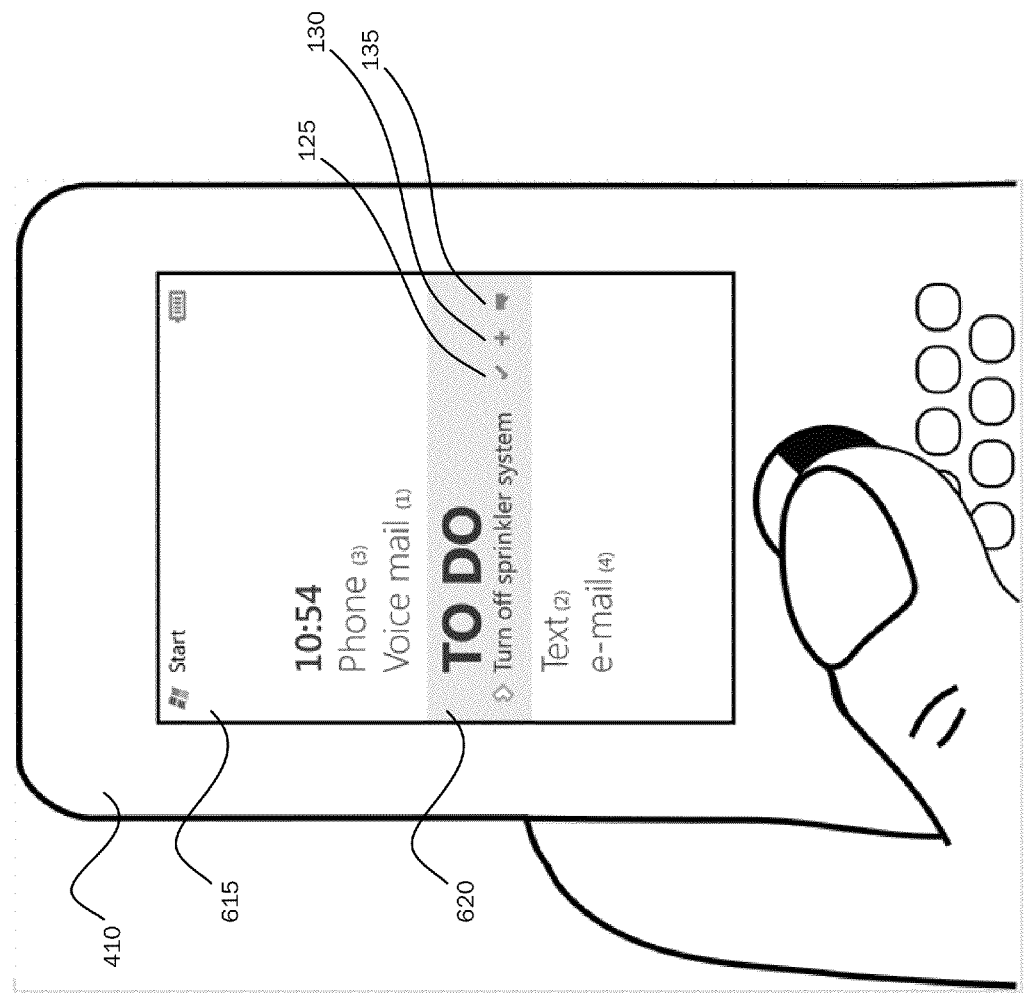
FIG. 6 is a simplified block diagram illustrating a mobile computing device and illustrating a list authoring surface user interface deployed on a display screen of the mobile computing device.
Figure 7:
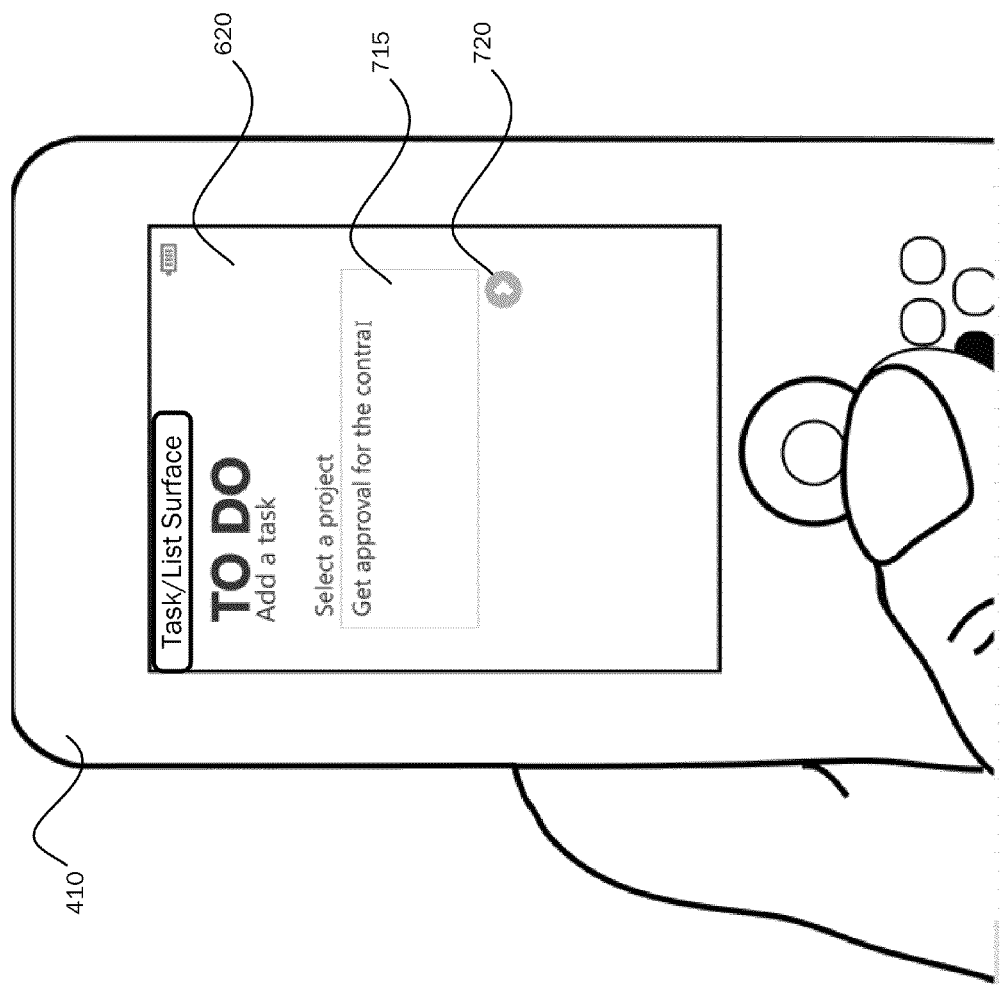
FIG. 7 is a simplified block diagram illustrating a mobile computing device and illustrating a list authoring surface user interface deployed on a display screen of the mobile computing device.

FIGS. 6 and 7 illustrate use of the list authoring surface and its associated user interface in a mobile environment. As illustrated in FIG. 6, the list authoring surface user interface 620 is illustrative of a mobile version of the list authoring surface UI 120, described above, deployed on the display screen 615 of a mobile telephone 410. Just as the user may deploy the list authoring surface user interface 120 on a display screen of his or her computer or laptop, as described above, with reference to FIGS. 1 through 5, so can the user deploy the list authoring surface user interface 620 on his or her mobile device to utilize the same functionality as may be utilized in a stationary computing environment.

Referring to FIG. 7, if the user launches the list authoring surface user interface 620, illustrated in FIG. 6, the "To do" list may be launched on the display screen of the user's mobile device to allow the user to review one or more tasks, events, activities or other information or to allow the user to enter additional information, edit existing information, or otherwise manipulate existing information. If the user does edit or otherwise manipulate information contained in the list authoring surface user interface via his or her mobile device, the modified information may be stored at the list 425,1025 via the server 420, and the next time the user deploys the list authoring surface user interface 120 on his or her stationary computing device, those changes or modifications made to information contained therein via the user's mobile device will appear in the user interface 120 deployed with respect to one or more other applications in the user's stationary computing environment.

In addition, the mobile device 410 may be utilized for quick capture of information that may be exported directly to the list authoring surface. For example, a camera function of a mobile telephone may be utilized for taking a photograph that may be automatically imported to the list authoring surface. For another example, global positioning system (GPS) data from the mobile device 410 or from any mobile computing device (e.g., laptop) with GPS or other location determining systems may be captured with respect to a particular location or address and may be imported to the list authoring surface.

As described above with reference to FIGS. 1-5, task items and list items may be manually entered or otherwise captured for entry into a list authoring surface that may be displayed across a multitude of applications and across a multitude of wired, wireless, stationary and mobile computing devices, including the mobile computing devices 410 illustrated in FIGS. 6 and 7. According to embodiments of the present invention, task and list items may be captured via voice or audio input for display in a task user interface or list authoring surface user interface on the capturing device (e.g., mobile telephone) or on any other wired or wireless computing device, as described herein.

For example, task or list items may be captured via voice or audio input while a user is driving, while a user is on the go, and long lists of items may be captured without requiring the user to look away from a primary item of focus. Capture of such information may be performed with minimal touch and/or interaction with the capturing device (e.g., mobile telephone), and the capture of the information may be performed without having to pause between input of various task or list items. In addition, the decisions or actions on captured items of interest may be deferred to a post-capture time when review of the captured information is more appropriate for the user. For example, a user may need to visit a local grocery store to purchase a variety of items for an upcoming office luncheon. According to embodiments of the present invention, the user may peer into his/her refrigerator or cupboard and may record onto his/her mobile computing device (e.g., mobile telephone) a list of items that are needed for the example office luncheon. After recording the list of needed items, the recorded list may be automatically transcribed locally on the recording device or remotely, and the transcribed list may be automatically populated into a task list or list authoring surface for subsequent review by the user. In addition, according to embodiments, an audio file of the recorded input may be attached to or otherwise associated with the transcribed and displayed list or task items to allow the user to play back the audio input, if desired.

In addition, transcribed audio input, for example, voice input recorded by a user, may be processed according to natural language processing, and metadata may be associated with the transcribed and processed voice or audio input to provide additional enhancement to the captured input. For example, according to natural language processing, a captured voice input of "obtain grocery items after 5:00 p.m." may result in metadata associated with the text portion "5:00 p.m." to allow a task item to be generated for the captured input that may be associated with an electronic calendar application utilized by the user and for which an automatic reminder may be generated for reminding the user to obtain the desired grocery items after 5:00 p.m. According to embodiments, other sensors or detection means may be utilized for tagging a task or list item with metadata. For example, a GPS location system may be used to tag a task or list item with location data associated with the task or list item when it is/was recorded. For another example, a clock, light sensor, photographic function and the like may be used to associate one or more contextual information items to a captured task or list item.

Once captured, transcribed and processed voice and/or other audio input is performed, resulting task or list items may be stored locally on the capturing device (e.g., mobile telephone), or may be stored remotely on a remote server for 420 for use in association with other computing devices, for example, for use in a list authoring surface displayed on the user's wired desktop computer 405 via a distributed computing network 415, as described above with reference to FIG. 4. That is, task and/or list items captured, transcribed and processed from recorded voice and/or other audio input, as described herein, may be utilized across a variety of computing devices and across a variety of software applications in the same manner as described for the list authoring surface and associated content, described above with reference to FIGS. 1-7.

Referring now to FIGS. 8-13, according to embodiments, a voice/audio recording and processing application (VRPA) 101 may be operated locally on the device 410 or may be accessed from a remote server 420 by the local device 410 for obtaining the recording, transcription, and processing functionality described herein. According to embodiments, after a voice or other audio recording is captured by the device 410, the recording may be stored locally at the device 410, or the recording may be passed to a remote server 420 for storage and for subsequent retrieval by the device 410, as required.

According to embodiments, after a given audio recording is captured, the VRPA 101 may allow for re-recording of the audio recording if the user believes the first recording is erroneous or incorrect in some manner. Such re-recording may be done in its entirety, or sections or lines of the captured audio may be re-recorded. For example, the VRPA may allow for a play back of a captured recording and may allow for a re-recording of portions of the recording or may allow for insertion of additional audio recording. Once recorded, these items may behave just like any other entered items (e.g., typed items) in the list authoring surface or other suitable list. That is, they may be reordered, sorted, and edited in the same manner as other input. And, metadata applied to such input may be edited and utilized as described below in the same manner as other inputted metadata.

A transcription application may be operated by the VRPA 101 either locally at the device 410 or remotely at the server 420 for automatically transcribing the captured voice and/or other audio input. That is, after a given voice and/or audio input is received, the input may be passed to a local or remote transcription application for transcribing the input into an associated text input that may be used for populating a task list or list authoring surface list that may be displayed on the device 410 or that may be displayed on one or more other computer generated displays, as described above with reference to FIGS. 1-7. The transcription of the captured voice and/or audio input may be stored locally at the device 410, or the transcription may be stored remotely at the server 420 for distribution to one or more other computing devices that may be utilized by a user as a task or list item.

Alternatively, the transcription application may be operated by the VRPA 101 at both locally at the device 410 and remotely at the server 420. For example, immediate, quick transcription processing may be done locally, and a more thorough and perhaps more accurate processing may be done at the server 420 where enhanced processing speed and functionality may reside. In addition, instead of the transcription application running on a server 420, the application may run on another device, for example, a laptop, slate, tablet, or desktop computer that is/are associated with the device 410.

Figure 8:
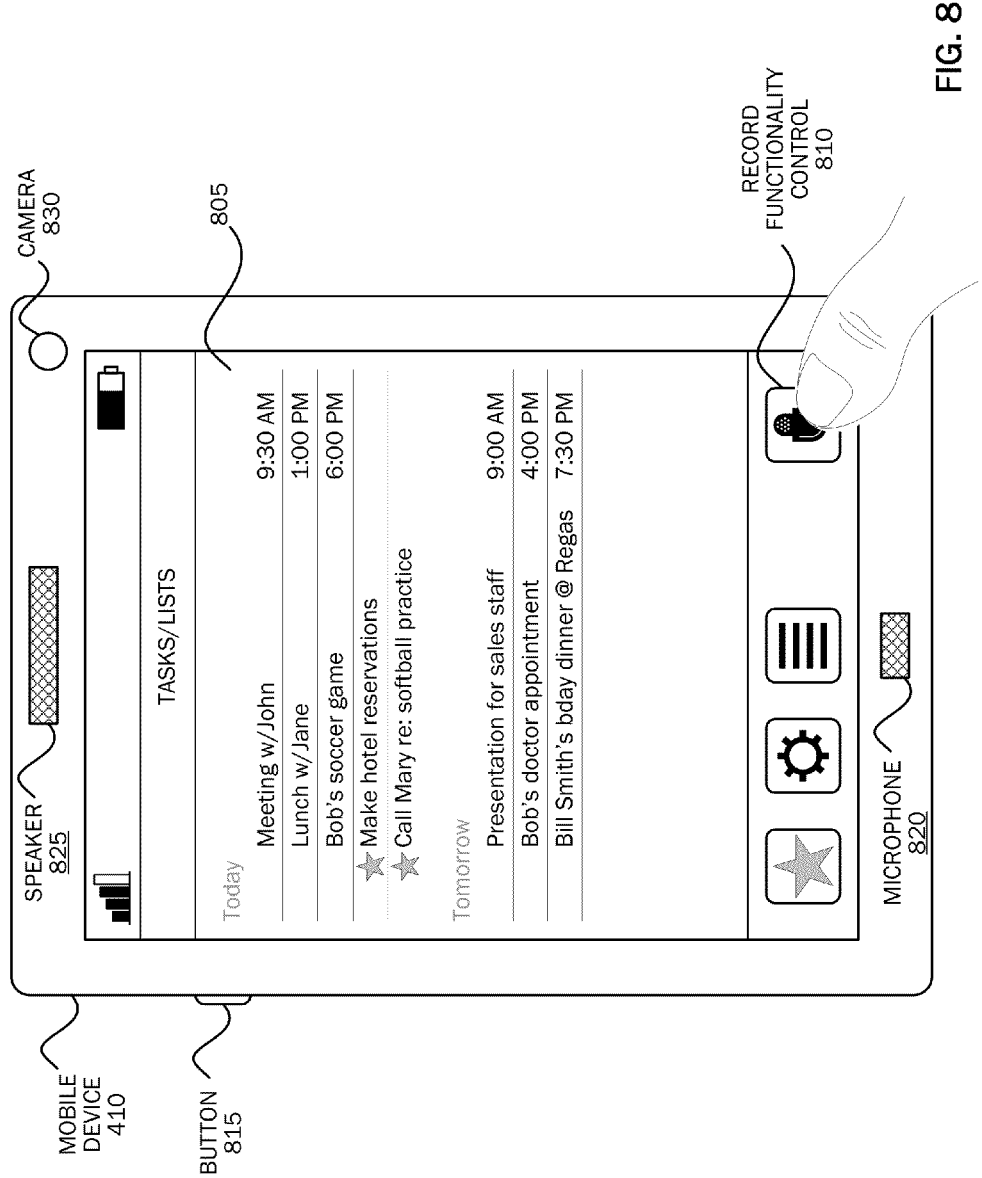
FIG. 8 is a simplified block diagram illustrating a mobile computing device with which voice or audio content may be captured for generation of an associated task or list item.

FIG. 8 is a simplified block diagram illustrating a mobile computing device with which voice and/or audio content may be captured for generation of an associated task or list item. That is, the device may be utilized to capture voice content spoken by a user, or the device may be used to capture other audio content, such as music, played recordings, and the like. In addition, the device 410 may be operative to capture video content with associated audio content. The audio portion of the captured video content may be utilized for generating and annotating task and list items as described herein. The computing device 410, illustrated in FIG. 8, is illustrative of any device with which voice or other audio content may be captured for generation of one or more tasks or list items for subsequent utilization, as described herein. According to embodiments, the device 410 may include a mobile telephone, slate and tablet type computers, handheld computing device, laptop computer, or the device 410 may include one or more wired or stationary computing devices coupled with an audio capturing means, for example, a microphone, for capturing voice or other audio input. In addition, the device 410 may include a computing device associated with presenting a display of content on a wall surface wherein such computing device is equipped with a recording means, for example, a microphone for receiving voice or other audio input or a telephone device that is operatively connected or associated with the computing device 410.

Referring to the device 410 illustrated in FIG. 8, an example mobile telephone is illustrated having a display screen 805 for displaying content for example, telephone messages, voice messages, electronic mail messages, text messages, and one or more tasks or list items generated and displayed according to embodiments of the present invention. The computing device 410 may include one or more means for capturing voice and other audio information. For example, a microphone 820 may be included for capturing one or more voice and/or audio inputs. A speaker 825 may be provided for playback of captured voice and/or audio input or for playing any other audio content provided through the device 410. A camera 830 is illustrative of a photographic means for capturing photographic images and video for use in association with captured voice and/or audio input.

According to embodiments, commencement of voice or audio recording or commencement of photographic or video content capture may be accomplished through a one or more suitable means. A hardware button 815 may be provided for activating an audio recorder or for activating a camera according to the designs of the device 410. For example, the hardware button 815 may be used to capture voice and audio even when the device 410 is locked. Such use of the hardware button 815 may allow for quick voice or audio capture. For example, upon a press and hold action on the button 815, voice or audio capture may be accomplished. Use of such a press and hold type interaction allows for avoidance of accidental voice/audio recordings. According to one embodiment, such use of the hardware button 815 may allow for quick capture of audio or voice content without requiring the user to unlock or access other functionalities of the associated device 410.

In addition, a variety of touch-activated user interface buttons, such as the record button 810, may be provided for allowing activation of a record or photographic function for capturing voice, audio or photographic content. In addition to hardware buttons 815 or user interface buttons 810, the recording or photographic functions may be activated and controlled through voice command. For example, a command such as "begin recording" or the like may be picked up by the microphone 820 for causing the commencement of audio recording. Likewise, a voice command such as "activate camera" or the like may be utilized for activating the photographic function of the device 410.

Figure 9:
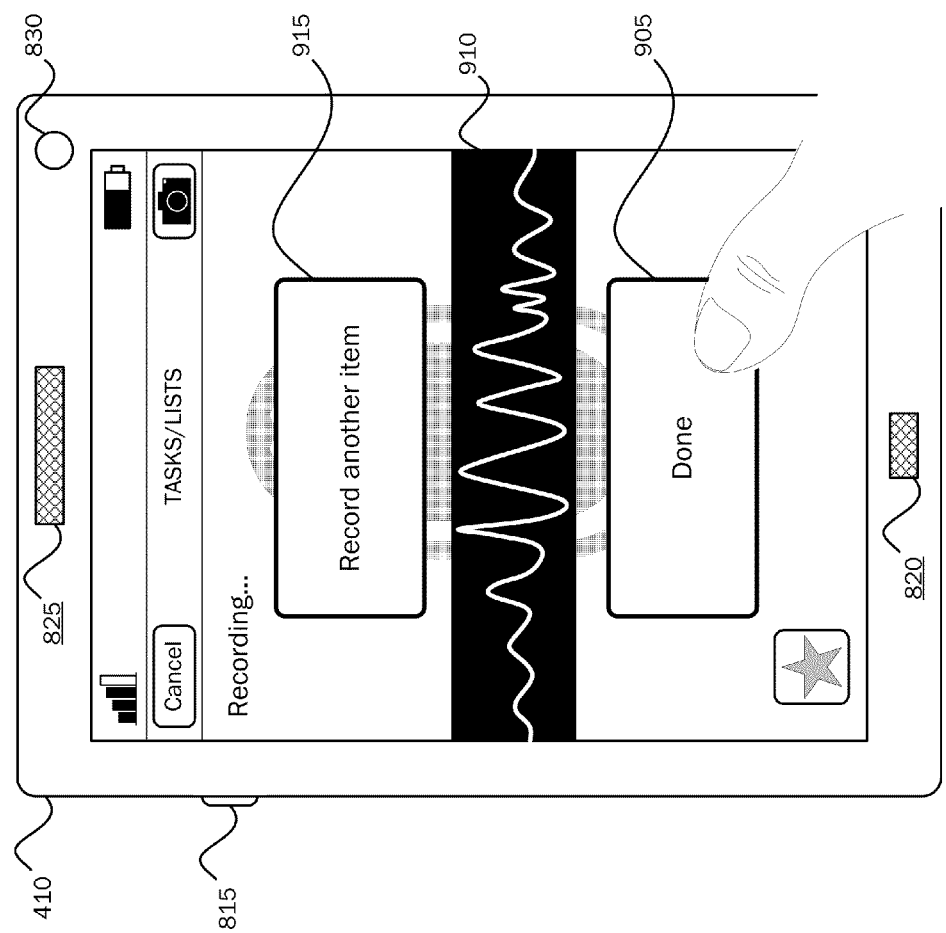
FIG. 9 is a simplified block diagram illustrating a mobile computing device with which voice or audio content may be captured for generation of an associated task or list item.

Referring to FIG. 9, once recording of a given voice or audio input commences, a user interface experience may be provided on the display of the device 410 for providing a visual indication 910 that recording is in progress and for providing selectable controls 905 for stopping recording or for continuing recording. For example the "Record another item" button 915 may be utilized for recording a subsequent task or list item after a previous item.

According to embodiments, the VRPA 101 may utilize an optimized grammar set for assisting in the generation of task items or list items in response to captured voice input. For example, words such as "start," "stop," "next," "begin," "end," "task," and the like may be utilized for translating captured voice and/or audio input into individual tasks and/or list items. For example, if a user speaks a grocery list of "eggs, next, bread, next, milk," the words "next" inserted between the other three words may be used by the VRPA 101 for separating the other three words into three list items of "eggs," "bread," and "milk."

Likewise, the utterance of a word such as "task" may be utilized for indicating to the VRPA 101 that words, terms, or phrases following the word "task" may be received as one or more task items. For example, upon recording the phrase "Task—prepare project documents by Tuesday," the words "prepare project documents by Tuesday" may be interpreted as a task following the utterance of the word "task." As should be appreciated, a multitude of optimized grammar terms or phrases may be utilized by the VRPA 101 for making the process of capturing voice and/or other audio input more efficient.

In addition, as illustrated below with respect to FIG. 11, a hardware or user interface keyboard 1105 may be provided for allowing manual input of task or list items and associated metadata items in association with or in addition to voice and/or other audio input. For example, a user may record one or more list items, for example, items from a grocery list, followed by manually entering one or more additional items at a time when the user may access the hardware or user interface keyboard. According to one embodiment, the user may fluidly move from voice recording to manual entry on a back and forth basis, as desired. For example, a user may be in the process of recording one or more task or list items, followed by manual entry that causes the entry of additional items in addition to automatically stopping the recording function, followed by additional voice and/or audio recording, as desired.

In addition, an audio file, for example, a .wav file containing the captured voice and/or audio input may likewise be stored locally or remotely and may be associated with the transcribed voice and/or audio input for playback as desired. For example, a transcription of a recorded list item, for example, "Remember to buy a birthday card and birthday cake for Sarah" may be shortened manually or automatically for entry into a list authoring surface list or task to a task or list item such as "Birthday cake and card." However, an audio file containing the entire audio input may be associated with the stored task or list item. Thus, the user may selectively play back the audio file to receive the entire audio input that was utilized for generation of the shortened task or list item. For example, upon receipt of the transcription of a given audio input, the user may manually shorten the transcribed audio input to a short phrase that may be used as a task or list item, but the user may desire subsequently to play back the entire audio input to provide the user with context for the task or list item.

In addition, for use of natural language processing and metadata application, as described below, keywords from a captured voice and/or audio input may be used for generating a task or list item for presentation via the device 410 or other device, as described above with reference to FIGS. 1 through 7. For example, if a keyword such as "next" or the like is used in the audio, the captured text may be split into separate sub-tasks, and the associated audio file may be clipped to have just the audio of the actual sub-task associated with the sub-task. In addition, use of such natural language processing and metadata application may be useful in catching and discarding or otherwise disposing of incorrect or erroneous audio recordings.

After a given voice and/or audio input is captured and transcribed, the transcribed content may be processed according to a natural language processing, as described above, wherein the content may be broken into individual words each of which may be compared to various sources, for example, dictionaries, contacts list, calendar items, and the like for obtaining metadata associated with terms, words or phrases comprising the transcribed content. Application of such metadata to the content may be utilized for generating a shortened task or list item that may be displayed for the transcribed content, or for associating the transcribed content with other application functionality. For example, the aforementioned phrase of "Remember to buy a birthday card and birthday cake for Sarah" may be parsed by a natural language parser, and keywords of "Remember," "birthday," "card," and "cake" may be utilized for generating a shortened task item or list item such as "Remember birthday card and cake."

In addition, if a transcribed content item contains information such as dates, times, or other information that may be identified through natural language processing, such information may be utilized for more efficiently and usefully processing the captured content. For example, if the captured voice and/or audio content includes the phrase "by 5:00 p.m. on Tuesday, Jul. 4," such information may be utilized for generating a task reminder or calendar reminder by identifying dates and/or times included in the captured content. Thus, such metadata extraction and utilization may be used for creating a task or list item from a captured voice and/or audio input item according to one or more application functionalities for example, task reminders, calendar reminders, and the like.

Figure 10:
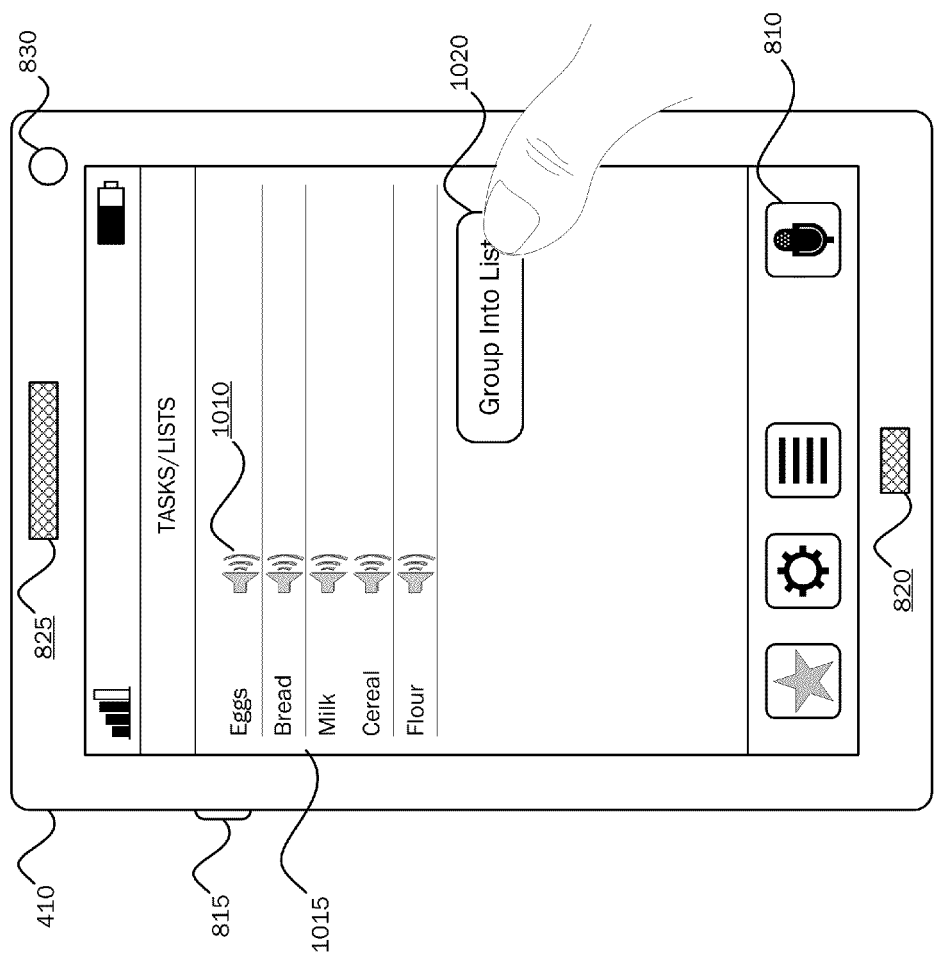
FIG. 10 is a simplified block diagram illustrating a mobile computing device on which is displayed a list of items obtained from and captured voice input.

Referring to FIG. 10, a list 1015 of items transcribed from a captured voice recording is presented in a user interface (e.g., a list authoring surface displayed in a device user interface) of the device 410. The example list of "eggs," "bread," and "milk," may have resulted from a grocery list recorded by a user, as described above. A "Group into list" button 1020 is provided for allowing a user to selectively group the presented items into a desired grouping. For example, a list of 14 grocery items may be presented to the user in response to a recording of 14 different items. A subset of five of the grocery items may be associated with a particular menu item, for example, a cake. If desired, the user may group a subset of the items into a particular grouping associated with the example menu item. As should be appreciated, any list items or task items (including groupings of list items and task items) may be stored and accessed in the same manner as the list authoring surface lists 425 described above with reference to FIG. 4. Alternatively, instead of using a "Group into list" function 1020, a user may enter via any suitable input means described herein a heading above the list, for example, "Cake for Julie's birthday," followed by indenting the list items under the heading, and the list items may be automatically arranged and stored as sub-tasks under the parent task of "Cake for Julie's birthday."

Referring still to FIG. 10, an audio icon 1010 is illustrated next to each displayed task or list item for notifying the user that the task or list item came from an audio recording and for allowing the user to play back the original audio recording associated with the presented task or list item. For example, as described above, a given task or list item such as "eggs" may have been generated from a lengthy audio file, and the user may desire to listen to the entire audio file to hear the context in which the user originally recorded the task or list item. Moreover, if the task or list items generated from the captured recording are distributed to other users, for example, other members of a work team, other users may desire to listen to the associated audio recordings to gain insights or context for the inclusion of one or more of the task or list items in a given listing of items 1015 or grouping of items. According to embodiments, if a given audio recording is played back, a user may append to the recording to add more information to the recording, and the added recording content may be used by the VRPA 101 for generating additional tasks and/or list items or for modifying previously generated tasks or list items.

In addition to associating the audio file with the list or task item, other content may likewise be associated with a given list or task item. For example, a photograph taken in association with a given list or task item may be associated with the list or task item, a document from which a voice recording of a list or task item is read may be associated with the list or task item, and the like. According to embodiments, a visual indication of the associated content may be presented in proximity to the displayed list or task item in the same manner as the audio icon 1010 to allow access (e.g., display and editing access) to the associated content.

Figure 11:
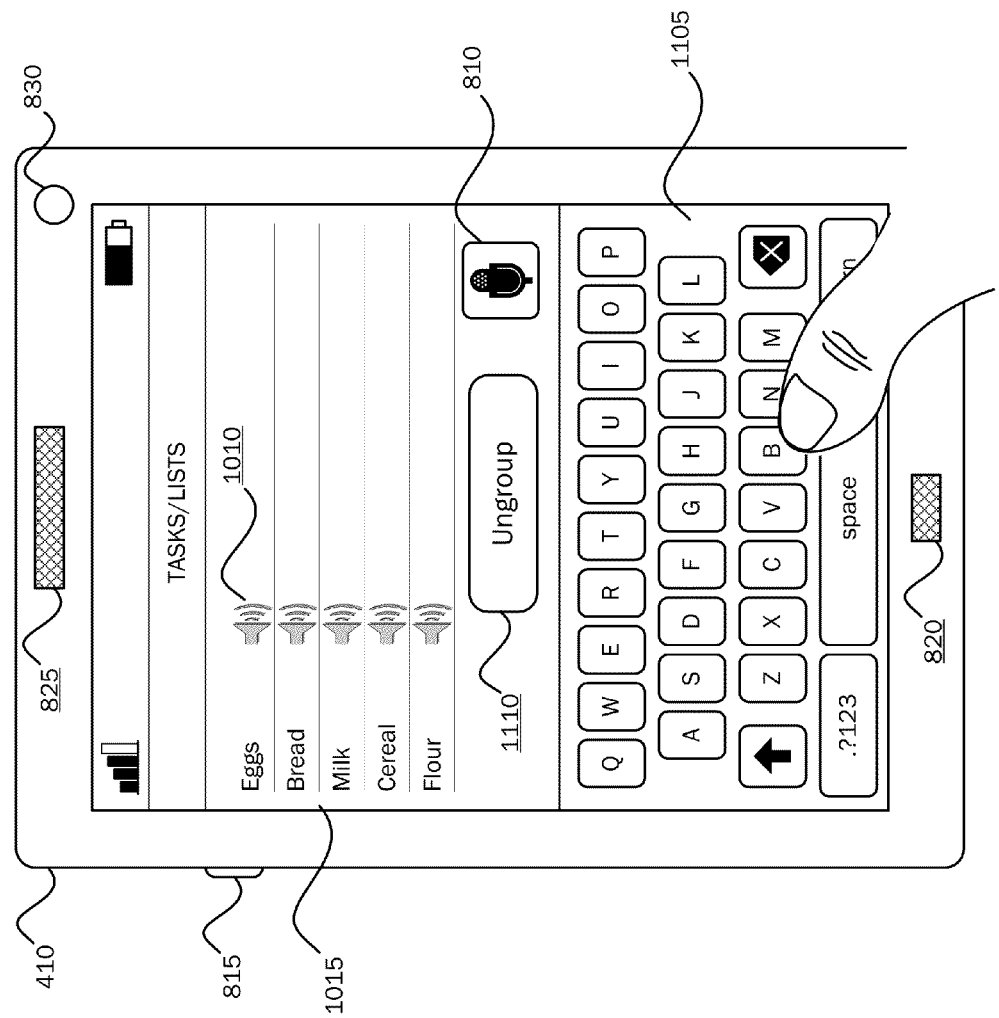
FIG. 11 is a simplified block diagram illustrating a mobile computing device on which is displayed a list of items obtained from and captured voice input.

As illustrated in FIG. 11, an "Ungroup" button or control 1110 may be provided for changing a grouping of previously grouped items. For example, the group of items illustrated in FIG. 10 may be "ungrouped" for removing the items as a specified grouping and for placing the items back into a listing of general items from which they were previously extracted for grouping into a given grouping.

A hardware or user interface keyboard 1105 is illustrated in FIG. 11 for manually entering task or list item information or for correcting or otherwise amending transcribed and displayed task or list items. For example, if the word "bread" illustrated in FIG. 10 is transcribed and displayed as "break," the keyboard 1105 may be utilized for editing the entry, as desired. In addition, voice controlled editing may be utilized for editing displayed task or list items. For example, the voice command of "replace the word break with the word bread" may be entered by a user to cause the VRPA 101 to replace an erroneously transcribed and displayed word of "break" with a corrected word of "bread."

Figure 12:
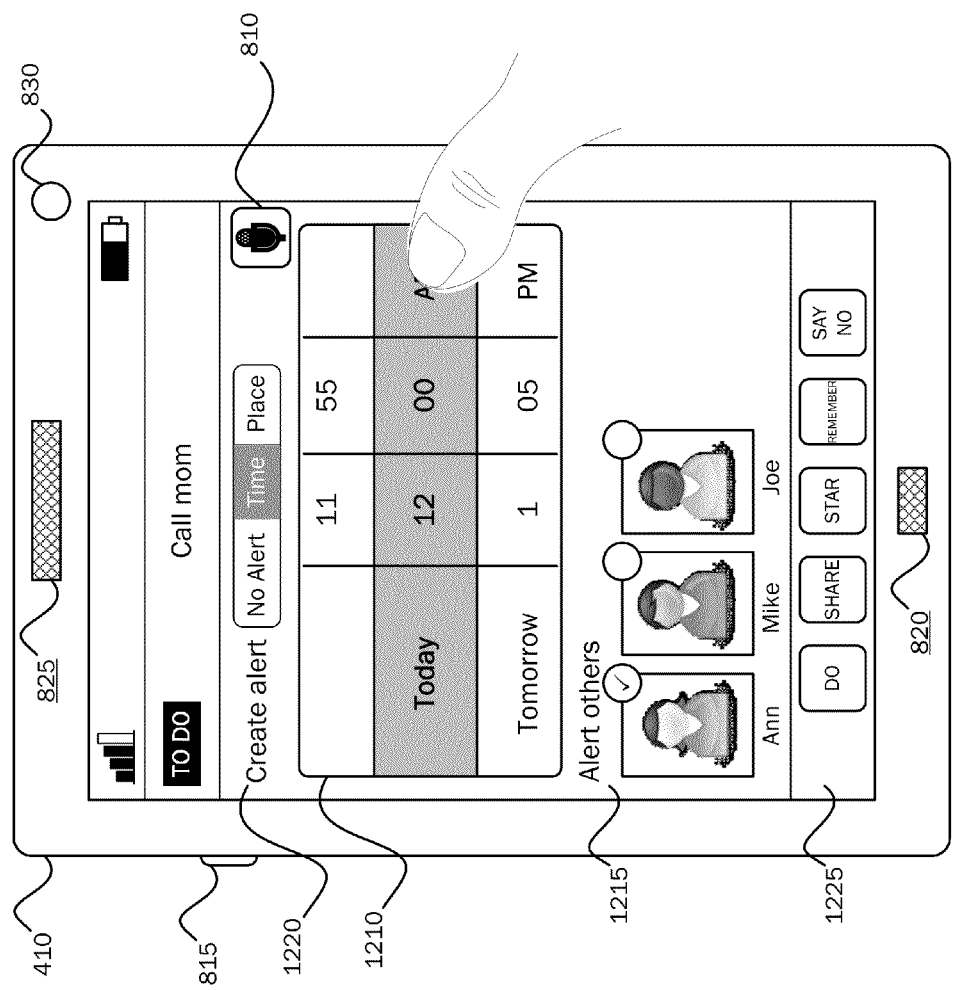
FIG. 12 is a simplified block diagram illustrating a mobile computing device on which is displayed calendar information displayed in association with captured and processed voice or audio input.

As illustrated in FIG. 12, a calendar/reminder interface may be provided for providing reminders for tasks and list items captured, transcribed and processed from voice and/or audio input. As illustrated in FIG. 12, metadata associated with words, terms or phrases extracted from captured voice and/or audio input may be utilized for generating reminders and/or calendar entries associated with captured input, as described above. Then, a variety of task application and/or calendar application functionality 1215, 1220, 1225 may be utilized in association with generated task items and list items, for example, allowing the user to alert others of a given list item or task item, providing reminders in association with task or list items, sharing task or list items with other users, and the like. As should be appreciated, task and/or list items generated from captured voice and/or audio input, as described herein, may be utilized according to the functionality of a variety of different software applications, as described herein, and as described above with respect to the list authoring surface illustrated and described with respect to FIGS. 1 through 7.

For example, as described above for list or task items entered into the list authoring surface (referring to FIGS. 1-7), timelines including hard dates/times and soft or fuzzy dates/times associated with task items or list items generated from recorded voice and/or audio content may be enabled and may be utilized for generating reminders and calendar entries associated with any generated task items or list items. That is, list items and task items generated from recorded voice and/or other audio input by the VRPA 101 may be tagged or grouped according to one or more metadata types, list item attributes or in association with a natural language processor, as described herein, and may then be utilized in a variety of helpful ways, including generation and display of resulting task items and list items. For example, date and/or time annotation or tagging applied to tasks, events, activities or other pieces of information (i.e., tasks) may be utilized for manipulating, e.g., editing, sorting, searching, or otherwise manipulating, list items and tasks and related information according to any applied metadata or list item attributes, e.g., date/time, people, teams, etc.

In addition, tasks annotated with a date and/or time metadata may be organized in an events timeline and may be further annotated to help the user accomplish or otherwise handle tasks along a prescribed timeline. As referred to herein, timeline may be broadly defined to include any time representation, including dates, times, calendar information, seasons, years, etc. For example, certain tasks may have hard deadlines, for example, a doctor's appointment on a specific date and time that may not be moved by the user.

Other tasks may require accomplishment or handling during a prescribed date/time range, for example, some time on Friday before 6:00 p.m. According to embodiments of the invention, such date and/or timing information may be applied to tasks or list items captured and processed via voice and/or audio input through the VRPA 101 to apply a "fuzziness" to the timing aspect of such task items or list items. For example, if on a given day two tasks must be accomplished or otherwise handled at very specific times, then those tasks may be annotated with metadata allowing the user to sort, search or otherwise manipulate those items based on the hard dates/times applied. On the other hand, if one or more other tasks or list items must be completed on the same day, but may be completed at any time up to a given end time, for example, 6:00 p.m., then those tasks or list items may be annotated with a metadata type allowing those items to move in the events timeline associated with tasks that must be accomplished or otherwise handled on the prescribed day so long as the times for accomplishing or otherwise handling those items do not go beyond a prescribed outer time limit, for example, 6:00 p.m. According to an embodiment, then, sorting, searching or otherwise manipulating list items or task items captured and processed from voice and/or audio input may be accomplished on list items having hard date/times, or may be accomplished on list items having soft or fuzzy date/times, or a combination thereof.

As described above for the list authoring surface 100, the voice recording and processing application (VRPA) 101 may provide reminders to the user to accomplish or otherwise handle task item or list items generated from voice or other audio input, and the inclusion of metadata associated with hard dates/times and metadata associated with soft or fuzzy dates/times may be utilized for providing a more realistic experience to the user. For example, a reminder of an upcoming hard date/time, for example, a specific appointment, may be of one variety of reminders and a reminder associated with a soft or fuzzy date/time may be of a different type of reminder that is less urgent in comparison to a reminder associated with a hard date/time. In addition, tasks associated with a soft or fuzzy date/time may be automatically floated through a given day's schedule until a prescribed end point, for example, no later than 6:00 p.m. is approached. Thus, the reminders associated with hard date/time items as compared to soft or fuzzy date/time items may be accomplished in a way that more closely approximates how a user might remind himself or herself of such items by jotting the items down on a scrap of paper, notepad, sticky note, and the like.

According to embodiments, metadata for a given task or list item, as described above, may be created and applied via voice recording. For example once a task or list item is recorded, the user may actuate a functionality control, such as the button 810, to add metadata to a particular task or list item. For example, after selection of a given task or list item, the user may select the button 810 followed by speaking the words "Today at 12 AM" for applying that example day and time to the selected task or list item as metadata. If the user is currently navigating to the calendar/reminder interface, illustrated in FIG. 12, the user's interaction with that interface may provide context to a grammar system of the VRPA 101 to allow the VRPA voice/audio capture grammar system to more accurately capture the fact that the user is speaking date information (or place information or people information, etc.), and thus creating more accurate interpretation of recordings.

Figure 13:
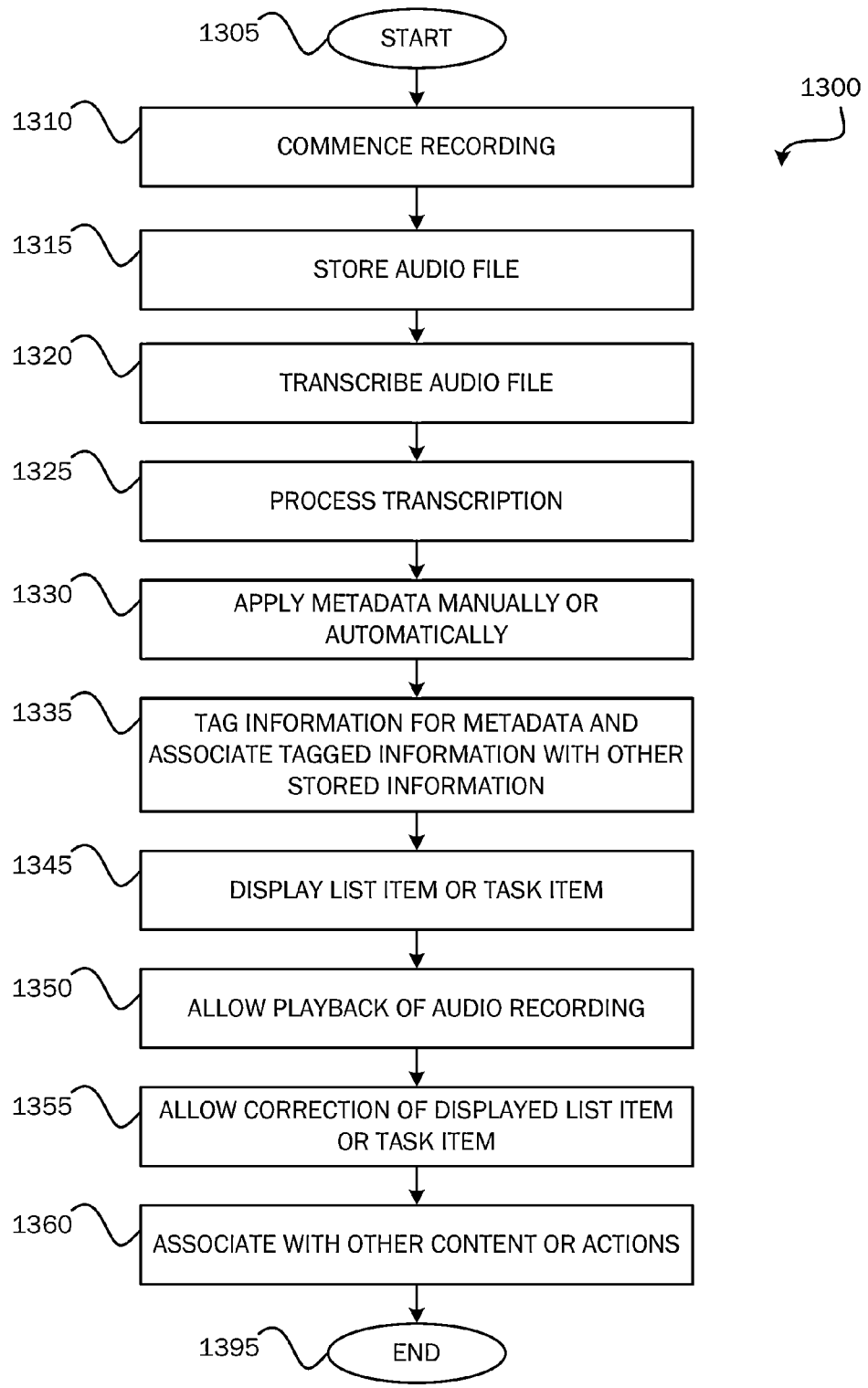
FIG. 13 is a flowchart illustrating a method for capturing voice and/or audio input and for populating an electronic task or list interface with information obtained from captured voice or audio recordings.
Figure 14:
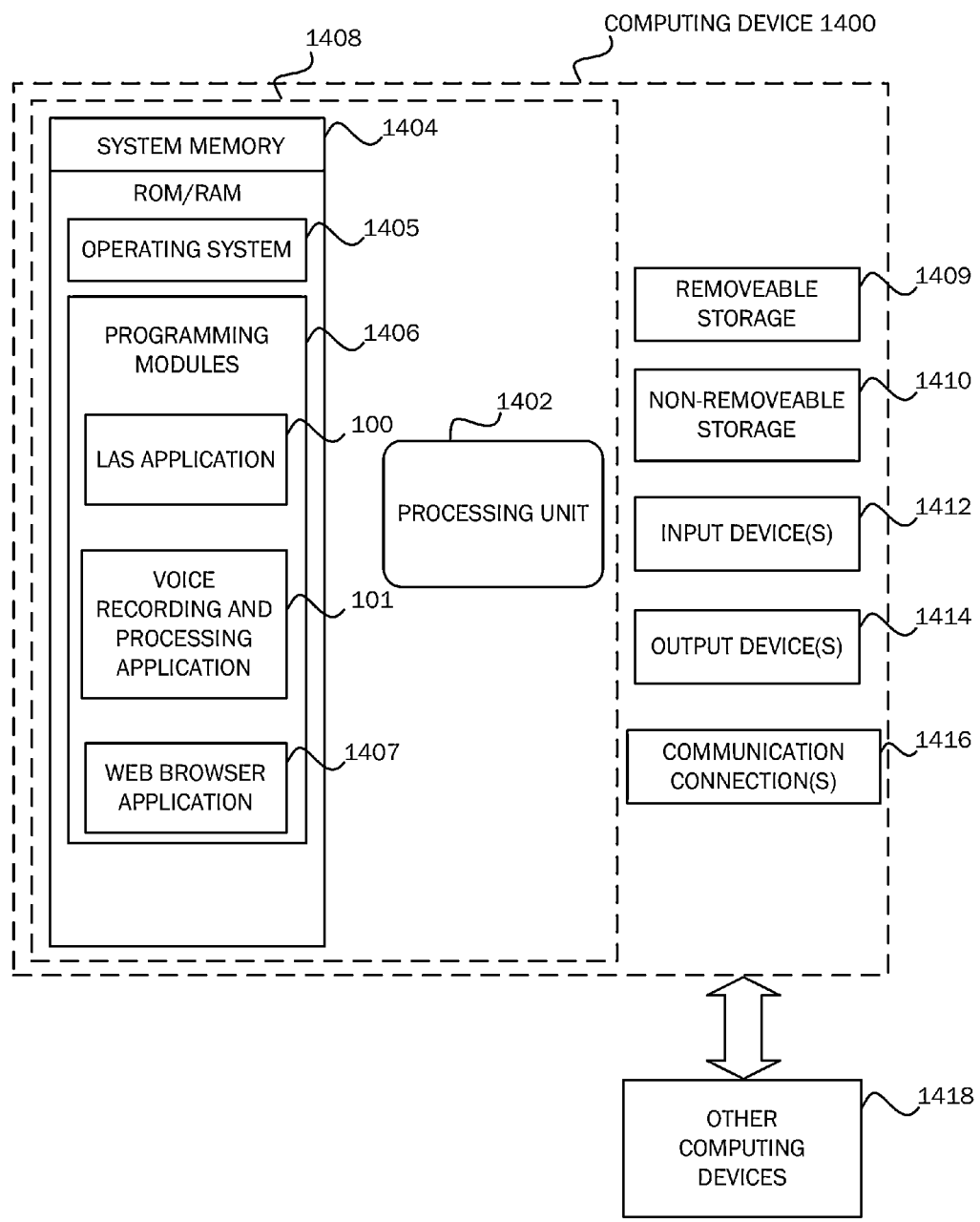
FIG. 14 is a simplified block diagram of a computing device with which embodiments of the present invention may be practiced.

Having described a system and operating architecture for automatic capture and population of task and list items in an electronic task or list surface via voice or audio input through an audio recording-capable computing device, FIG. 13 is flowchart illustrating a method for capturing voice and/or audio input and for populating an electronic task or list surface with information obtained from captured voice or audio recordings. The routine 1300 begins at start operation 1305 and proceeds to operation 1310 where a user commences recording for the generation of one or more task items or list items to be displayed on the capturing device, for example, the user's mobile telephone or to be displayed on another computing device via a distributed computing system 415, as described above with reference to FIG. 4. For example, a user may utilize his/her mobile telephone to record a list of items that the user needs to perform for a job assignment over the course of the next two weeks.

As described above, the user may commence the recording process through a variety of means, for example, hardware button, user interface presented recording button (i.e., touch screen interaction), voice command activation, or gesture received and interpreted by the recording computing device (e.g., via a gesture detection function such as a camera or motion sensor operative or accelerometer to pass gesture movements to an application that may interpret the gestures as commands). At operation 1315, after the user stops the recording process, an audio file for the captured audio recording may be stored locally at the recording device 410, or the audio file may be stored remotely at a server 420. At operation 1320, the stored audio file may be transcribed into one or more text strings that may be used for generating one or more task and/or list items for display in a task list or list authoring surface user interface, as described above. In addition, as described above, during the transcription process, a given audio recording may be split into two or more separate files, each of which may receive metadata applications and each of which may be utilized as separate task or list items. The transcribed audio file may be stored locally or remotely, as described above.

At operation 1325, the transcribed audio file may be processed according to natural language processing, wherein the transcribed audio recording may be broken into one or more terms, words, or phrases. Each of the terms, words or phrases extracted from the transcribed audio file may be compared against a variety of sources, for example, dictionaries, contacts lists, calendar items, and the like for determining whether any of the words, terms, or phrases extracted from the transcribed audio file are associated with one or more pieces of information, for example, other task items, calendar items, dates, times, persons, identifications, and the like.

At operation 1330, metadata associated with any of the extracted terms, words, or phrases may be applied to the extracted terms, words, or phrases, for utilizing the terms, words, phrases, or text strings comprised of the terms, words, or phrases in association with one or more applications. For example, metadata applied to a given term, for example, a date or time applied to the phrase "5:00 p.m." may be used for identifying the phrase as a date or time for entering a text string containing the phrase as a reminder, task item, or calendar entry. Metadata may be applied to a task or list item according to a variety of input means, and metadata may be recorded via voice input for association with a given task or list item, as described above.

At operation 1335, extracted terms, words or phrases comprising generated task or list items may be tagged with metadata to associate generated task or list items with other stored information, for example, contacts items, calendar entries, other generated task or list items, and the like. For example, all list items grouped together via the "Group into list" function may cause metadata to be applied to each grouped together item to associate each of the grouped together items as belonging together until they are otherwise ungrouped or separated.

At operation 1345, the generated list item or task item may be displayed in a user interface of the capturing device or in a task interface or list authoring surface associated with another computing device to which the generated list item or task item is distributed. At operation 1350, playback of an audio file from which the generated list item or task item may be allowed and, if desired, the audio file may be amended by adding additional audio content through additional recording. At operation 1355, a user may correct a displayed list item or task item via keystroke entry or via voice activated correction.

At operation 1360, task or list item may be associated with other content items and actions. For example, a task or list item may be associated with maps, other tasks or lists, various other users or any other content or action that may be associated with the metadata applied to the task or list item. According to one embodiment, at operation 1360, any timelines, as described above, including hard dates/times and soft or fuzzy dates/times associated with task items or list items generated from recorded voice and/or audio content may be enabled and may be utilized for generating reminders and calendar entries associated with the task items or list items. For example, metadata extracted from or applied to a given electronic task item generated from a captured voice input may be used to identify a time of completion for the task item. The task item may then be stored with other task items, and a timeline for completion of the various task items, including the task item generated from the captured voice input, may be created. According to the use of hard dates/times and soft or "fuzzy" dates/times for task completion, described above, the stored task items may be arranged relative to one another such that any of one or more task items that must be performed at a particular time are arranged according to the particular time and such that any of the one or more task items that may be performed at any time are arranged at other available times not including the particular time.

According to embodiments, after task or list items are generated via voice and other audio input, user interaction with task or list items may be tracked, including tracking when such items are accomplished. Information about user interaction with task or list items, including statistical information showing numbers of accomplished tasks or list items may be published to the user or to other users via a variety of suitable means including intranets, Internet-based or cloud based communications systems or via one or more social networks. Publication of such user interaction information may be important in helping users to appreciate their accomplishments or the accomplishments of other users for whom they receive such information. The method ends at operation 1395.

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIGS. 14-16 and the associated descriptions provide a discussion of a variety of operating environments in which embodiments of the invention may be practiced. However, the devices and systems illustrated and discussed with respect to FIGS. 14-16 are for purposes of example and illustration and are not limiting of a vast number of computing device configurations that may be utilized for practicing embodiments of the invention, described herein.

FIG. 14 is a block diagram illustrating example physical components of a computing device 1400 with which embodiments of the invention may be practiced. The computing device components described below may be suitable for the computing devices described above, for example, the computing devices 405, 410 and the server and database systems 420. In a basic configuration, computing device 1400 may include at least one processing unit 1402 and a system memory 1404. Depending on the configuration and type of computing device, system memory 1404 may comprise, but is not limited to, volatile (e.g. random access memory (RAM)), non-volatile (e.g. read-only memory (ROM)), flash memory, or any combination. System memory 1404 may include operating system 1405, one or more programming modules 1406, and may include a LAS application 100, a VRPA 101, and a web browser application 1420. Operating system 1405, for example, may be suitable for controlling computing device 1400's operation. Furthermore, embodiments of the invention may be practiced in conjunction with a graphics library, other operating systems, or any other application program and is not limited to any particular application or system. This basic configuration is illustrated in FIG. 14 by those components within a dashed line 1408.

Computing device 1400 may have additional features or functionality. For example, computing device 1400 may also include additional data storage devices (removable and/or non-removable) such as, for example, magnetic disks, optical disks, or tape. Such additional storage is illustrated in FIG. 14 by a removable storage 1409 and a non-removable storage 1410.

As stated above, a number of program modules and data files may be stored in system memory 1404, including operating system 1405. While executing on processing unit 1402, programming modules 1406, such as the LAS application 100 and the voice recording and processing application (VRPA) 101, may perform processes including, for example, one or more method 1300's stages as described above. The aforementioned process is an example, and processing unit 1402 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 14 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the LAS application 100 and/or the VRPA application 101 may be operated via application-specific logic integrated with other components of the computing device/system 1400 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information, such as computer readable instructions, data structures, program modules, or other data. System memory 1404, removable storage 1409, and non-removable storage 1410 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1400. Any such computer storage media may be part of device 1400. Computing device 1400 may also have input device(s) 1412 such as a keyboard, a mouse, a pen, a sound input device, a touch input device, etc. Output device(s) 1414 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 15A:
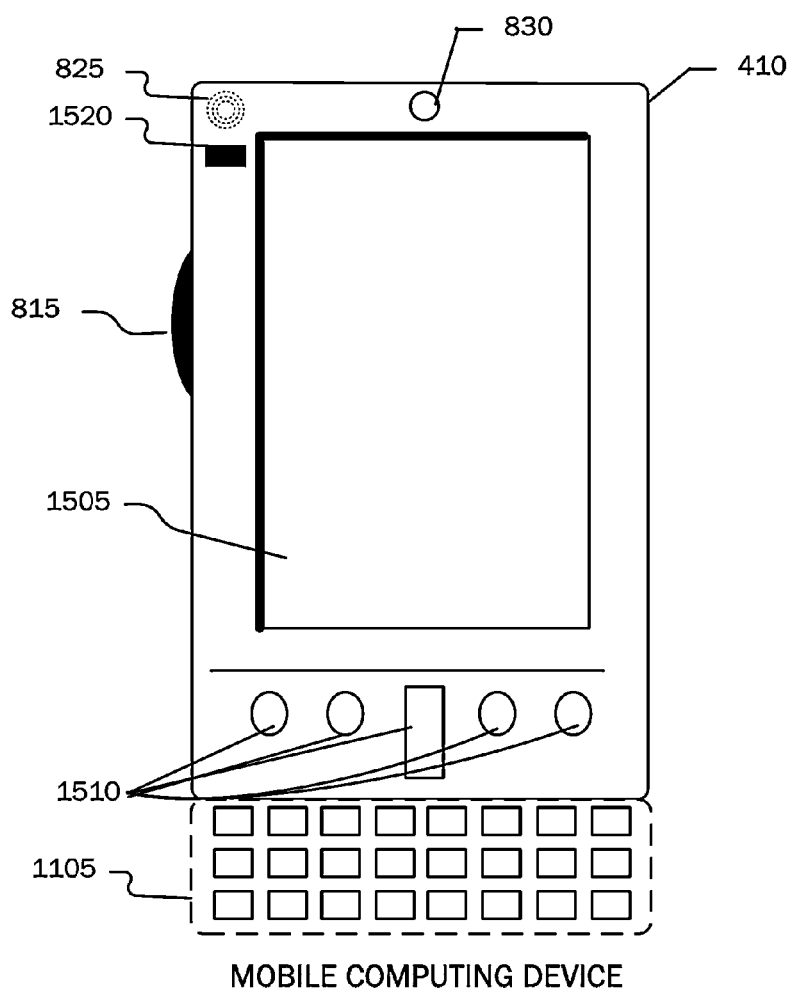
FIGS. 15A and 15B are simplified block diagrams of a mobile computing device with which embodiments of the present invention may be practiced.
Figure 15B:
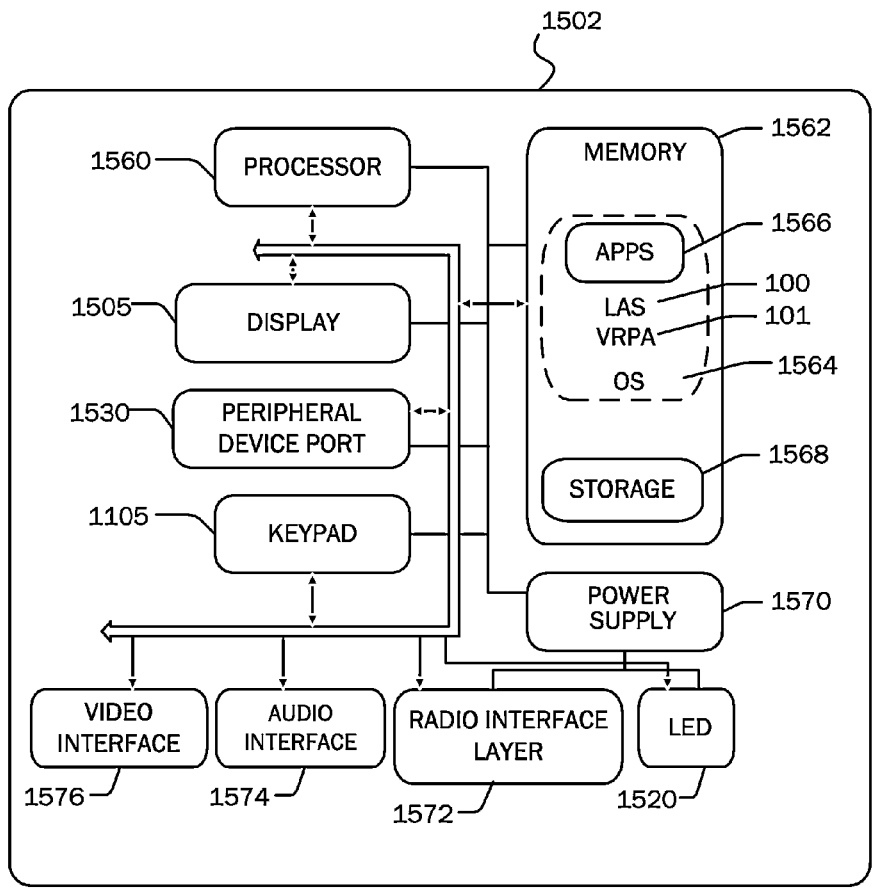
Figure 16:
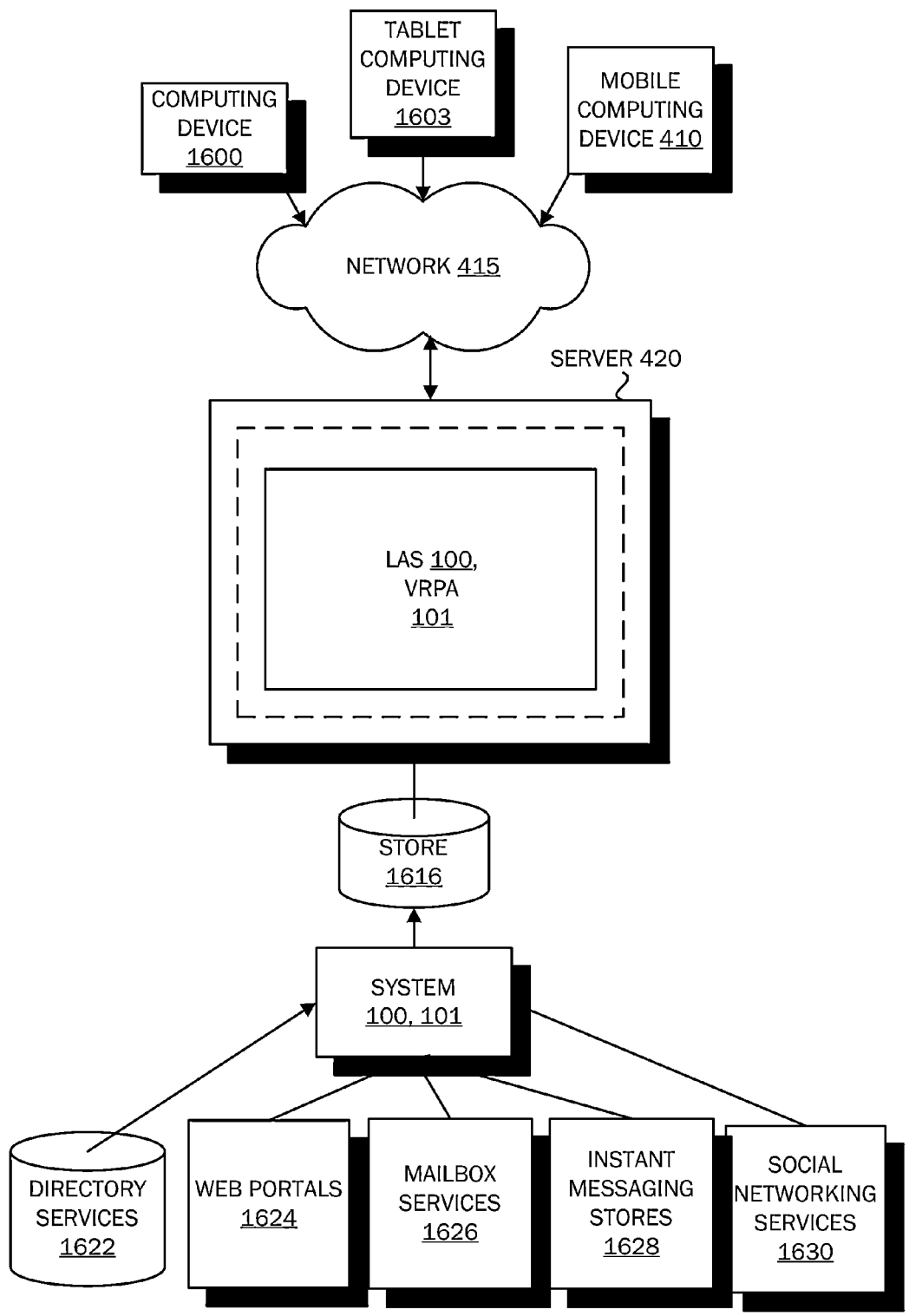
FIG. 16 is a simplified block diagram of a distributed computing system in which embodiments of the present invention may be practiced.

FIGS. 15A and 15B illustrate a suitable mobile computing environment, for example, a mobile telephone 410, a smartphone, a tablet personal computer, a laptop computer, and the like, with which embodiments of the invention may be practiced. With reference to FIG. 15A, an example mobile computing device 410 for implementing the embodiments is illustrated. In a basic configuration, mobile computing device 410 is a handheld computer having both input elements and output elements. Input elements may include touch screen display 1505 and input buttons 1510 that allow the user to enter information into mobile computing device 410. Mobile computing device 410 may also incorporate an optional side input element 815 allowing further user input. Optional side input element 815 may be a rotary switch, a button, or any other type of manual input element. In alternative embodiments, mobile computing device 410 may incorporate more or less input elements. For example, display 1505 may not be a touch screen in some embodiments. In yet another alternative embodiment, the mobile computing device is a portable phone system, such as a cellular phone having display 1505 and input buttons 1510. Mobile computing device 410 may also include an optional keypad 1105. Optional keypad 1105 may be a physical keypad or a "soft" keypad generated on the touch screen display.

Mobile computing device 410 incorporates output elements, such as display 1505, which can display a graphical user interface (GUI). Other output elements include speaker 825 and LED light 1520. Additionally, mobile computing device 410 may incorporate a vibration module (not shown), which causes mobile computing device 410 to vibrate to notify the user of an event. In yet another embodiment, mobile computing device 410 may incorporate a headphone jack (not shown) for providing another means of providing output signals.

Although described herein in combination with mobile computing device 410, in alternative embodiments the invention is used in combination with any number of computer systems, such as in desktop environments, laptop or notebook computer systems, multiprocessor systems, micro-processor based or programmable consumer electronics, network PCs, mini computers, main frame computers and the like. Embodiments of the invention may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate embodiments of the present invention.

FIG. 15B is a block diagram illustrating components of a mobile computing device used in one embodiment, such as the computing device shown in FIG. 15A. That is, mobile computing device 410 can incorporate system 1502 to implement some embodiments. For example, system 1502 can be used in implementing a "smart phone" that can run one or more applications similar to those of a desktop or notebook computer such as, for example, browser, e-mail, scheduling, instant messaging, and media player applications. In some embodiments, system 1502 is integrated as a computing device, such as an integrated personal digital assistant (PDA) and wireless phone.

One or more application programs 1566 may be loaded into memory 1562 and run on or in association with operating system 1564. Examples of application programs include phone dialer programs, e-mail programs, PIM (personal information management) programs, word processing programs, spreadsheet programs, Internet browser programs, messaging programs, and so forth. System 1502 also includes non-volatile storage 1568 within memory 1562. Non-volatile storage 1568 may be used to store persistent information that should not be lost if system 1502 is powered down. Applications 1566 may use and store information in non-volatile storage 1568, such as e-mail or other messages used by an e-mail application, and the like. A synchronization application (not shown) also resides on system 1502 and is programmed to interact with a corresponding synchronization application resident on a host computer to keep the information stored in non-volatile storage 1568 synchronized with corresponding information stored at the host computer. As should be appreciated, other applications may be loaded into memory 1562 and run on the device 410 including the list authoring service application 100 and the voice recording and processing application 101, described herein.

System 1502 has a power supply 1570, which may be implemented as one or more batteries. Power supply 1570 might further include an external power source, such as an AC adapter or a powered docking cradle that supplements or recharges the batteries.

System 1502 may also include a radio 1572 that performs the function of transmitting and receiving radio frequency communications. Radio 1572 facilitates wireless connectivity between system 1502 and the "outside world", via a communications carrier or service provider. Transmissions to and from radio 1572 are conducted under control of OS 1564. In other words, communications received by radio 1572 may be disseminated to application programs 1566 via OS 1564, and vice versa.

Radio 1572 allows system 1502 to communicate with other computing devices, such as over a network. Radio 1572 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of system 1502 is shown with two types of notification output devices; LED 1520 that can be used to provide visual notifications and an audio interface 1574 that can be used with speaker 825 to provide audio notifications. These devices may be directly coupled to power supply 1570 so that when activated, they remain on for a duration dictated by the notification mechanism even though processor 1560 and other components might shut down for conserving battery power. LED 1520 may be programmed to remain on indefinitely until the user takes action to indicate the powered-on status of the device. Audio interface 1574 is used to provide audible signals to and receive audible signals from the user. For example, in addition to being coupled to speaker 825, audio interface 1574 may also be coupled to a microphone 820 to receive audible input, such as to facilitate a telephone conversation. In accordance with embodiments of the present invention, the microphone 820 may also serve as an audio sensor to facilitate control of notifications, as will be described below. System 1502 may further include video interface 1576 that enables an operation of on-board camera 830 to record still images, video stream, and the like.

A mobile computing device implementing system 1502 may have additional features or functionality. For example, other sensors or detection means may be utilized in association with the system 1502 as described above, such as global positioning satellite system (GPS) location systems, clock systems, light sensors, photographic functions and the like that may be used to assist in the capture and generation of task or list items and to associate one or more contextual information items to a captured task or list item. For another example, the device may also include additional data storage devices (removable and/or non-removable) such as, magnetic disks, optical disks, or tape. Such additional storage is illustrated in FIG. 15B by storage 1568. Computer storage media may include volatile and nonvolatile, removable and non-removable media implemented in any method or technology for storage of information, such as computer readable instructions, data structures, program modules, or other data.

Data/information generated or captured by the device 410 and stored via the system 1502 may be stored locally on the device 410, as described above, or the data may be stored on any number of storage media that may be accessed by the device via the radio 1572 or via a wired connection between the device 410 and a separate computing device 405 associated with the device 410, for example, a server computer in a distributed computing network 415 such as the Internet. As should be appreciated such data/information may be accessed via the device 410 via the radio 1572 or via a distributed computing network 415. Similarly, such data/information may be readily transferred between computing devices for storage and use according to well-known data/information transfer and storage means, including electronic mail and collaborative data/information sharing systems.

FIG. 16 illustrates a system architecture for providing list items and task items captured via voice and/or audio recording to various client devices via a distributed computing environment after generation as described above. As described previously, a voice recording and processing application (VRPA) 101 may generate and tag with metadata one or more list items or task items from recorded voice or other audio input. Captured voice/audio input and associated metadata and generated list items and task items may also be stored in different communication channels or other storage types. For example, list items and task items along with information from which they are developed may be stored using a variety of databases or other storage means, such as directory services 1622, web portals 1624, mailbox services 1626, instant messaging stores 1628 and social networking sites 1630. The systems/applications 100, 101 may use any of these types of systems or the like for developing list items and task items and for storing same in a store 1616. A server 420 may provide list items and task items to clients. As one example, server 420 may be a web server providing list items and task items over the web. Server 420 may provide online list items and task items over the web to clients through a network 415. Examples of clients that may obtain list items and task items include computing device 405, which may include any general purpose personal computer 1400, a tablet computing device 1603 and/or mobile computing device 410 which may include smart phones. Any of these devices may obtain list items and task items from the store 1616.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method for generating an electronic task item from captured audio input, comprising:
   receiving a first audio content item;
   transcribing the first audio content item into a first text string representing the first audio content item;
   applying one or more metadata items to the first text string for identifying one or more components of the first text string;
   generating a first electronic task item including the one or more components of the first text string;
   displaying the first electronic task item in a list authoring user interface;
   associating an audio file containing the first audio content item with the displayed first electronic task item; and
   displaying a selectable visual indicator of the associated audio file in proximity to the displayed first electronic task item.

2. The method of claim 1, further comprising:
   receiving a selection of the selectable visual indicator of the associated audio file; and
   providing a playback of the audio file containing the first audio content item.

3. The method of claim 1, wherein applying the one or more metadata items to the first text string for identifying the one or more components of the first text string includes applying the one or more metadata items via one or more input means, including voice input, gesture input, typing input, touch input, location sensor input, light sensor input, sound sensor input, video input and photographic input.

4. The method of claim 1, wherein applying the one or more metadata items to the first text string for identifying the one or more components of the first text string includes applying the one or more metadata items for associating the first electronic task item with one or more people associated with the first electronic task item.

5. The method of claim 1, wherein applying the one or more metadata items to the first text string for identifying the one or more components of the first text string includes applying the one or more metadata items for associating the first electronic task item with one or more locations associated with the first electronic task item.

6. The method of claim 1, wherein applying the one or more metadata items to the first text string for identifying the one or more components of the first text string includes applying the one or more metadata items for associating the first electronic task item with one or more dates and times associated with the first electronic task item.

7. The method of claim 1, further comprising comparing the one or more components of the first text string with one or more components of a second text string transcribed from a second audio content item for associating the first text string with the second text string.

8. The method of claim 7, wherein associating the first text string with the second text string includes grouping the first electronic task item with a second electronic task item generated from the second text string and further comprising displaying the first and second electronic task items together as a grouping of related task items.

9. The method of claim 1, further comprising enabling editing actions on the first text string and on one or more other text strings including text revisions, sorting, filtering, and searching.

10. The method of claim 1, wherein transcribing the first audio content item into the first text string representing the first audio content item includes:
    parsing the first audio content item for one or more keywords associated with two or more electronic task items;
    splitting the first audio content item into two or more audio content items associated with the one or more keywords associated with respective two or more audio content items; and
    displaying a text string for each of the two or more audio content items as electronic task items for each of the two or more audio content items.

11. The method of claim 1, further comprising generating a reminder for completion of the first electronic task item, and presenting the reminder in association with the first electronic task item prior to a time for completion of the first electronic task item.

12. The method of claim 11, wherein presenting the reminder in association with the first electronic task item prior to the time for completion of the first electronic task item includes playing the received first audio content item as the reminder.

13. The method of claim 1, wherein prior to transcribing the first audio content item into the first text string representing the first audio content item, receiving a playback of the received first audio content item, allowing a re-recording of one or more portions of the received first audio content item for correction one or more portions of the received first audio content item, and wherein transcribing the first audio content item into the first text string representing the first audio content item includes transcribing a corrected first audio content item into the first text string.

14. A computer-readable hardware storage device containing computer-executable instructions which when executed by a computer perform a method for generating an electronic task item from captured audio input, comprising:
    receiving a first audio content item;
    transcribing the first audio content item into a first text string representing the first audio content item;
    applying one or more metadata items to a subset of one or more words comprising the first text string for identifying one or more components of the first text string;
    generating a first electronic task item including the subset of one or more words comprising the first text string;
    displaying the first electronic task item in a list authoring user interface;
    associating an audio file containing the first audio content item with the displayed first electronic task item; and
    displaying a selectable visual indicator of the associated audio file in proximity to the displayed first electronic task item.

15. The computer-readable hardware storage device of claim 14, further comprising:
    receiving a selection of the selectable visual indicator of the associated audio file; and
    providing a playback of the audio file containing the first audio content item.

16. A system for generating an electronic task item from captured audio input, comprising:
- a processing unit;
- a memory containing computer-executable instructions which when executed by the processing unit provide:
- a voice recording and processing application coupled with a recording-capable computing device, the voice recording and processing application operative to:
  - receive a first audio content item;
  - transcribe the first audio content item into a first text string representing the first audio content item;
  - apply one or more metadata items to the first text string for identifying the one or more components of the first text string;
  - generate a first electronic task item including the one or more components of the first text string;
  - display the first electronic task item in a list authoring user interface in association with any of a plurality of software application user interfaces operative to display the list authoring user interface;
  - associate an audio file containing the first audio content item with the displayed first electronic task item;
  - display a selectable visual indicator of the associated audio file in proximity to the displayed first electronic task item;
  - receive a selection of the selectable visual indicator of the associated audio file; and
  - provide a playback of the audio file containing the first audio content item.

\* \* \* \* \*